United States Patent
Sasaoka et al.

(10) Patent No.: US 7,634,088 B2
(45) Date of Patent: Dec. 15, 2009

(54) RADIO COMMUNICATIONS SYSTEM

(75) Inventors: Hideichi Sasaoka, Kyotanabe (JP); Tomoyuki Aono, Kyoto (JP); Takashi Ohira, Kyoto (JP)

(73) Assignees: The Doshisha, Kyoto (JP); Advanced Telecommunications Research Institute International, Kyoto (JP)

( * ) Notice: Subject to any disclaimer, the term of this patent is extended or adjusted under 35 U.S.C. 154(b) by 609 days.

(21) Appl. No.: 10/553,956

(22) PCT Filed: Feb. 25, 2004

(86) PCT No.: PCT/JP2004/002228

§ 371 (c)(1),
(2), (4) Date: Oct. 19, 2005

(87) PCT Pub. No.: WO2005/025126

PCT Pub. Date: Mar. 17, 2005

(65) Prior Publication Data

US 2006/0252381 A1    Nov. 9, 2006

(30) Foreign Application Priority Data

Sep. 4, 2003 (JP) ............................. 2003-312156
Jan. 5, 2004 (JP) ............................. 2004-000533

(51) Int. Cl.
H04L 9/00 (2006.01)

(52) U.S. Cl. ........................ 380/44; 380/47; 455/410; 455/411

(58) Field of Classification Search .............. 380/44, 380/47; 455/410, 411
See application file for complete search history.

(56) References Cited

U.S. PATENT DOCUMENTS 4,156,241 A * 5/1979 Mobley et al. ............... 342/352
5,222,137 A * 6/1993 Barrett et al. ............... 380/271
5,513,263 A * 4/1996 White et al. ................. 380/44

(Continued)

FOREIGN PATENT DOCUMENTS

JP          5-233326          9/1993

(Continued)

OTHER PUBLICATIONS

Aono T et al., "Wireless secret key generation exploiting reactance-domain scalar response of multipath fading channels", XP002358707, vol. 53, No. 11, Nov. 2005, pp. 3776-3784.

(Continued)

*Primary Examiner*—Kimyen Vu
*Assistant Examiner*—John B King
(74) *Attorney, Agent, or Firm*—McDermott Will & Emery LLP

(57) ABSTRACT

A radio communications system includes radio devices, and antenna and an array antenna. The radio devices communicate a prescribed signal via the antenna and the array antenna in a system of transmission and reception at a single frequency, such as time division duplex, as the array antenna changes the in directivity to form a plurality of directivities. The radio devices detect a plurality of received radio waves' strength to produce receive signal profiles, respectively, indicating a plurality of strength profiles. The radio devices multivalue strength of the receive signal profiles, respectively, and generate private keys having the multivalued plurality of values serving as a bit pattern.

12 Claims, 16 Drawing Sheets

U.S. PATENT DOCUMENTS

| | | | |
|---|---|---|---|
| 5,534,872 A * | 7/1996 | Kita | 342/146 |
| 6,166,700 A * | 12/2000 | Jenkin et al. | 343/761 |
| 6,169,902 B1 * | 1/2001 | Kawamoto | 455/456.4 |
| 6,301,405 B1 * | 10/2001 | Keil | 385/25 |
| 6,999,729 B2 * | 2/2006 | Wandel | 455/69 |
| 7,069,054 B2 * | 6/2006 | Doi et al. | 455/562.1 |
| 7,269,174 B2 * | 9/2007 | Olson et al. | 370/395.31 |
| 2002/0111191 A1 * | 8/2002 | Takatori et al. | 455/562 |
| 2006/0252381 A1 * | 11/2006 | Sasaoka et al. | 455/78 |

FOREIGN PATENT DOCUMENTS

| | | |
|---|---|---|
| JP | 2001-326630 | 11/2001 |
| JP | 2002-152191 | 5/2002 |
| JP | 2002-189543 | 7/2002 |
| JP | 2003-018091 | 1/2003 |
| JP | 2004-32679 | 1/2004 |
| WO | WO 03/073689 | 9/2003 |

OTHER PUBLICATIONS

Hershey J. E. et al, "Unconventional Cryptographic Keying Variable Management", XP000487370, vol. 43, No. 1, Jan. 1995, pp. 3-6.

Hero A O, "Secure Space-Time Communication", XP002318759, Apr. 24, 2001, pp. 1-37.

European Search Report dated Jan. 5, 2006.

Motoki Horike, Hideichi Sasaoka, "Rikuji Ido Tsushinro no Fukisoku Hendo ni Motozuku Himitsu Kagi Kyoyu Hoshiki", The Institute of Electronics, Information and Communication Engineers Gijutsu Kenkyu Hokoku, RCS2002-173, Oct. 11, 2002, vol. 102, No. 374, pp. 7-12.

Japanese Office Action, with English translation, issued in Japanese Patent Application No. JP 2005-513582 dated on Jun. 20, 2008.

Kitaura et al "A Scheme of Secret Key Agreement Based on the Channel Characteristics in OFDM Land Mobile Radio" The Institute of Electronics, Information and Communication Engineers Technical Report pp. 23-29 vol. 103, No. 254 Aug. 2008.

Mori, H., et al., "A Study of Optimal Antenna Pattern for Making Secret Key Based on Space Correlation of the Strength of Received Signal", Technical Report of IEICE, Nov. 14, 2003. pp. 47-52, vol. 103 No. 457, The Institute of Electronics, Information And Communication Engineers, with English Abstract.

Nakayama, K., et al., "A study of security communication scheme over fading channel", Proceedings of the 2002 IEICE General Conference-Communication, Mar. 7, 2002, p. 523, B-5-73, The Institute of Electronics, Information and Communication Engineers, with partial English translation.

Decision of Patent Grant for Japanese Patent Application No. 2005-513582, mailed Jan. 14, 2009 and the English translation thereof.

* cited by examiner

F I G. 1
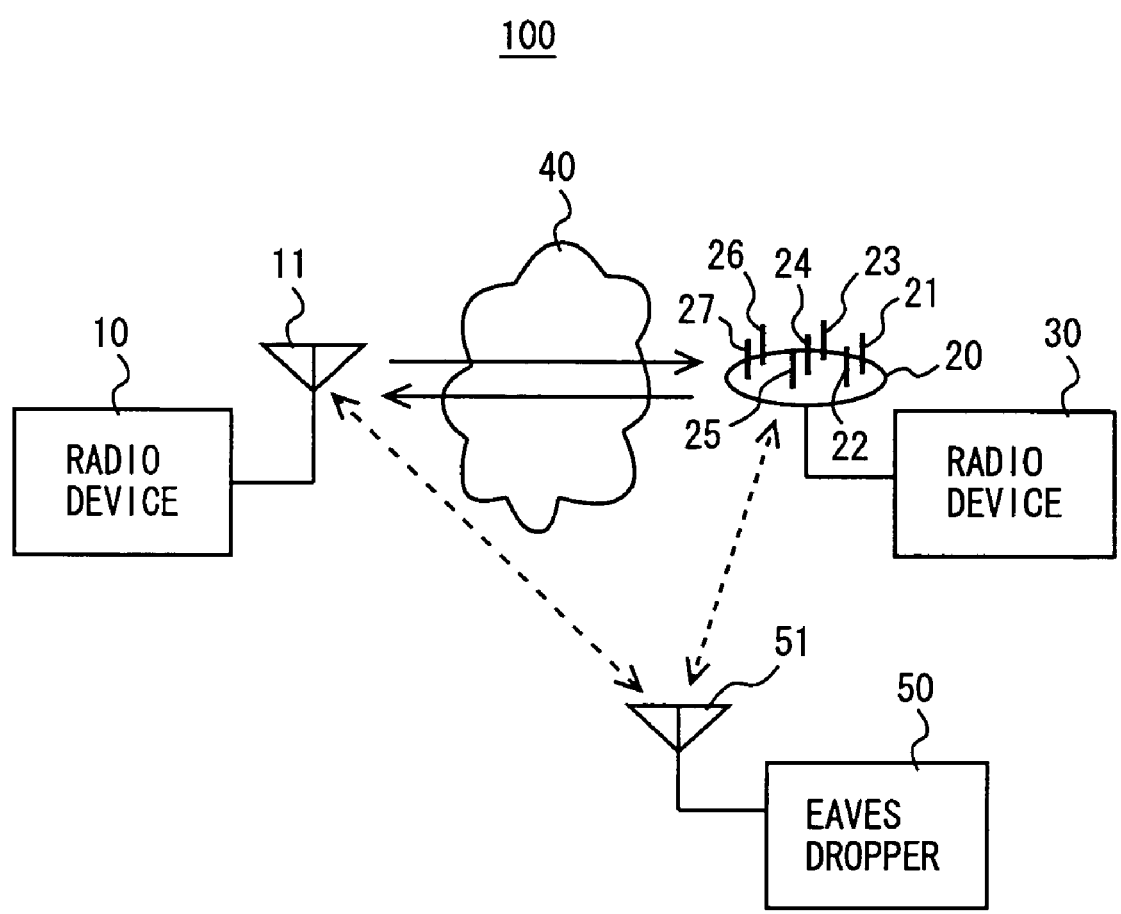

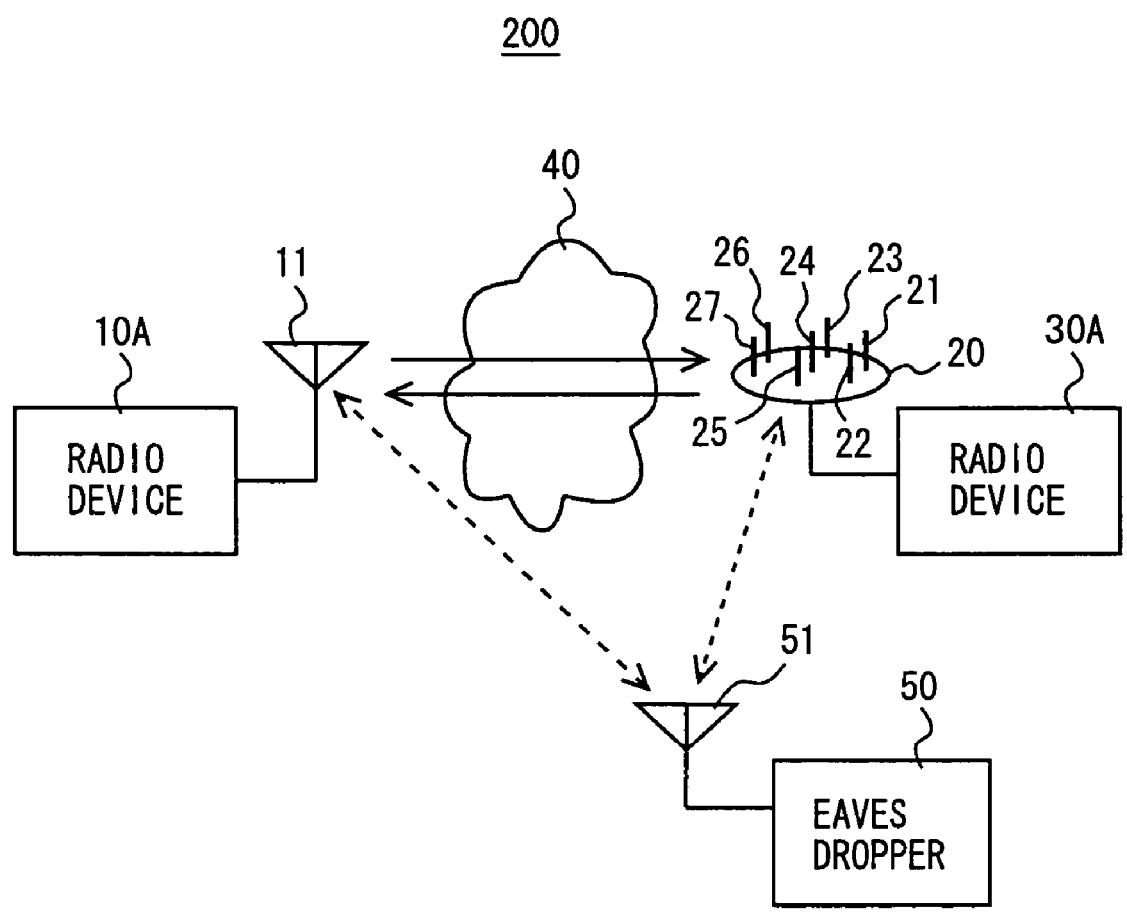
F I G. 9

F I G. 1 0
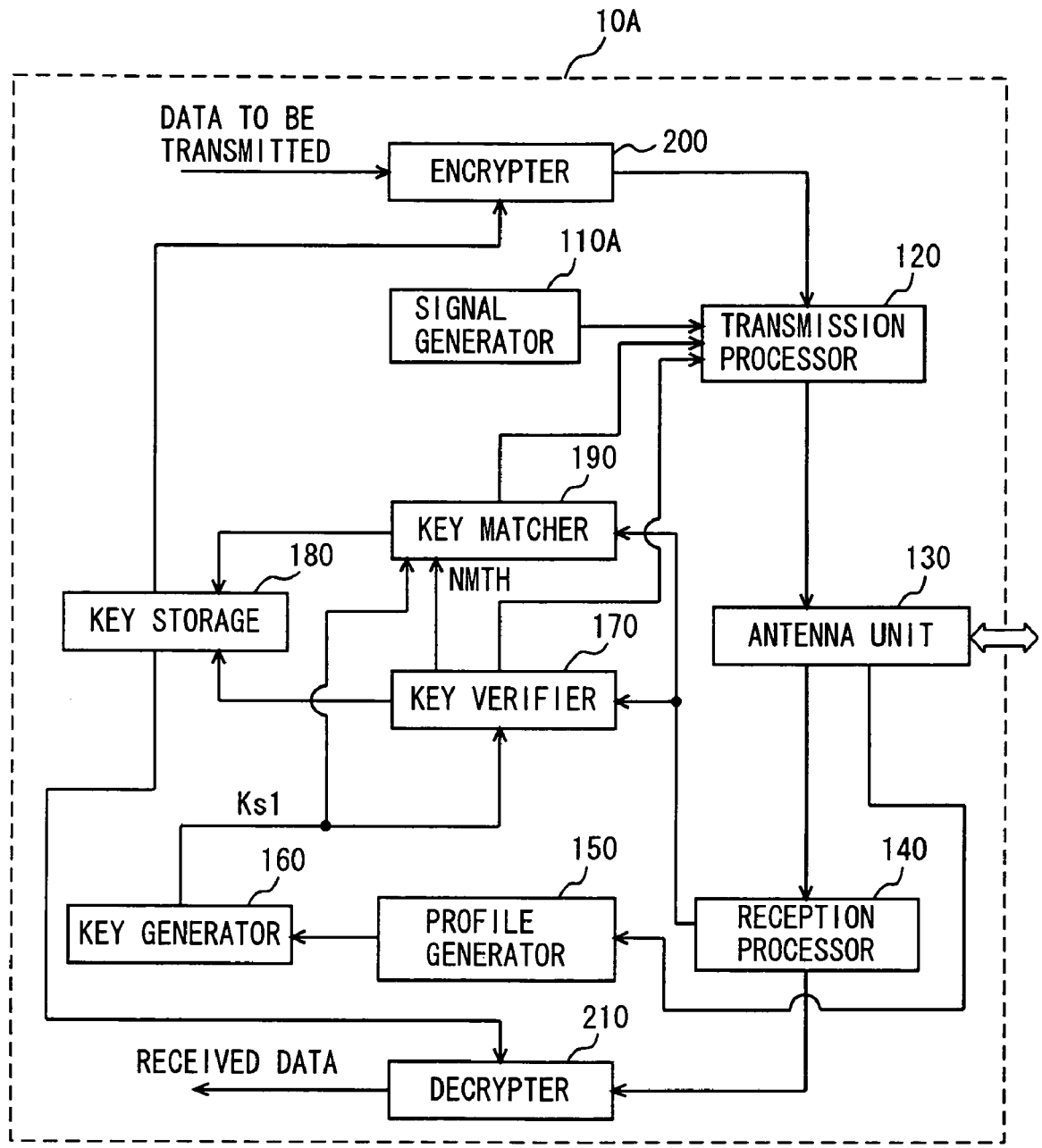

F I G. 1 6
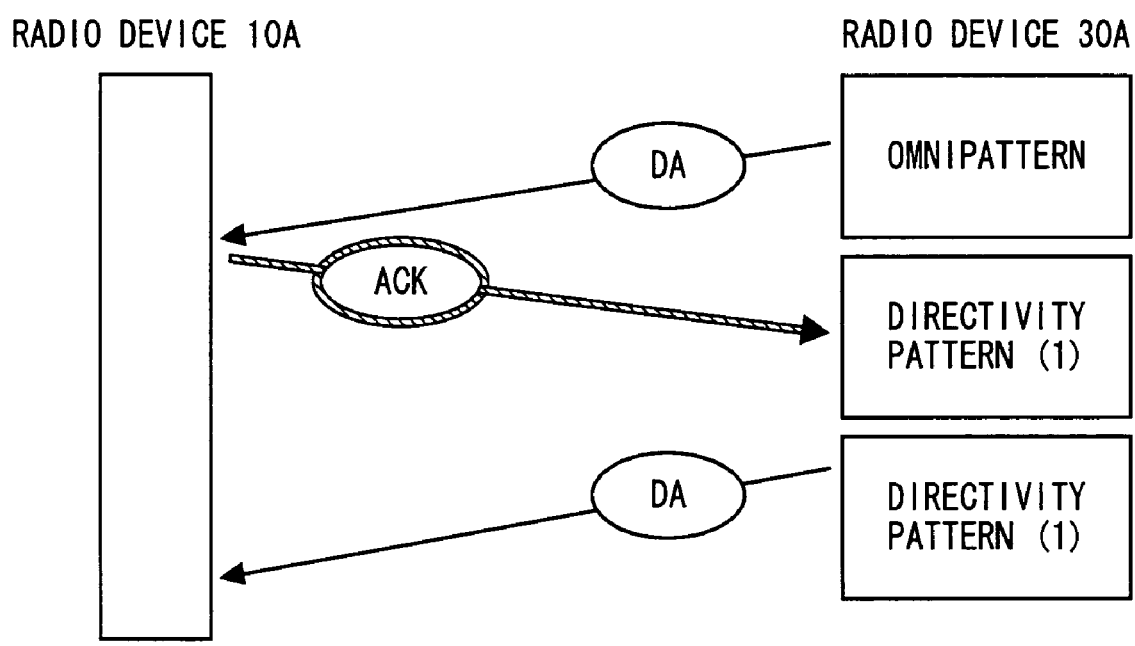

RADIO COMMUNICATIONS SYSTEM

This application is the U.S. National Phase under 35 U.S.C. § 371 of International Application No. PCT/JP2004/002228, filed Feb. 25, 2005, which in turn claims the benefit of Japanese Application No. 2003-312156, filed Sep. 4, 2003 and Japanese Application No. 2004-000533, filed Jan. 5, 2004, the disclosures of which Applications are incorporated by reference herein in their entirety.

TECHNICAL FIELD

The present invention relates generally to radio communications systems and particularly to those communicating encrypted information by radio.

BACKGROUND ART

Recently as our society is increasingly information-oriented, communications of information are becoming increasingly important, and eavesdropping and improper use of information are becoming an increasingly serious concern. To prevent eavesdropping, information has conventionally been encrypted and transmitted.

Information is encrypted and communicated between terminals in systems. Among them, there are public key cryptography and private key cryptography. Public key cryptography provides a high level of safety, however it is not suitable for encrypting large amounts of data.

In contrast, private key cryptography allows a process to be relatively readily performed and also allows large amounts of data to be rapidly encrypted. Private key cryptography, however, requires transmitting a private key to the counterpart of the communication. Furthermore in private key cryptography if the same private key is continuously used it becomes pervious to decryption and the system's safety may be damaged.

Accordingly, as a method sharing a private key without transmitting the key to a counterpart is suggested measuring a characteristic of a transmission path between two terminals and using the measured characteristic to generate a private key at each terminal (Motoki Horiike, Hideichi Sasaoka, "A Scheme of Secret Key Agreement Based on the Random Fluctuation of Channel Characteristics in Land Mobile Radio", The Institute of Electronics, Information and Communication Engineers, October 2002, TECHNICAL REPORT OF IEICE RCS2002-173, pp. 7-12).

In this method, a delay profile provided when data is communicated between two terminals is measured at each terminal and converted from an analog signal to a digital signal to generate a private key at each terminal. More specifically, an radio wave propagating through a transmission path exhibits reversibility, and a delay profile provided when data is transmitted from one terminal to the other terminal is identical to that provided when the same data is transmitted from the other terminal to one terminal. Accordingly, a private key generated as based on the delay profile measured at one terminal is identical to that generated as based on the delay profile measured at the other terminal.

Thus, in the method utilizing a transmission path's characteristic to generate a private key, simply communicating single data between two terminals enables a single private key to be shared.

If the data transmitted between the two terminals is eavesdropped by a third party in the vicinity of each terminal and the delay profile is measured, however, the eavesdropper can obtain a delay profile close to that measured at each terminal and may succeed in decrypting the private key.

The present invention therefore contemplates a radio communications system capable of reducing eavesdropping of private key.

DISCLOSURE OF THE INVENTION

In accordance with the present invention a radio communications system includes first and second antennas and first and second radio devices. The first antenna has a directivity electrically switchable. The first and second radio devices mutually transmit and receive a radio wave through a radio transmission path via the first and second antennas. The first radio device receives a radio wave or waves from the second radio device while changing a directivity of the first antenna with prescribed patterns to form a plurality of directivities, generates a first receive signal profile indicative of a strength profile of a plurality of radio waves received with the respective ones of the directivities, and generates a first private key based on the generated first receive signal profile. The second radio device receives a radio wave or waves from the first radio device while changing a directivity of the first antenna with prescribed patterns to form a plurality of directivities, generates a second receive signal profile indicative of a strength profile of a plurality of radio waves received with the respective one of the directivities, and generates a second private key identical to the first private key based on the generated second receive signal profile.

Preferably the first and second receive signal profiles are each formed of a plurality of strength corresponding to the plurality of directivities. The first and second radio devices multivalue the plurality of strength to generate the first and second private keys, respectively.

Preferably the first and second radio devices transmit and receive the plurality of radio waves in a time division duplex system.

Preferably the first radio device verifies that the first private key generated matches the second private key.

Furthermore in the present invention a radio communications system includes first and second antennas and first and second radio devices. The first antenna has a directivity electrically switchable. The first and second radio devices mutually transmit and receive a radio wave through a radio transmission path via the first and second antennas. The first radio device receives a radio wave or waves corresponding to a plurality of data transmitted by the second radio device in accordance with a prescribed communications protocol while changing a directivity of the first antenna with prescribed patterns to form a plurality of directivities, generates a first receive signal profile indicative of a strength profile of a plurality of radio waves received with the respective ones of the directivities, and generates a first private key based on the generated first receive signal profile. The second radio device receives a radio wave or waves corresponding to a plurality of data transmitted by the first radio device in accordance with a prescribed communications protocol while changing a directivity of the first antenna with prescribed patterns to form a plurality of directivities, generates a second receive signal profile indicative of a strength profile of a plurality of radio waves received with the respective ones of the directivities, and generates a second private key identical to the first private key based on the generated second receive signal profile.

Preferably, when the first radio device has the first antenna controlled to be omnidirectional the first radio device establishes the radio transmission path between the first radio device and the second radio device and thereafter the first radio device has the first antenna changing the directivity to form the plurality of directivities, while the first radio device communicates the plurality of data with the second radio device.

Preferably, when the first radio device communicates each of the data with the second radio device, the first radio device updates a directivity of the first antenna to receive the data from the second radio device and maintains the updated directivity of the first antenna to transmit the received data to the second radio device.

Preferably the prescribed communications protocol is formed of a plurality of hierarchical layers. The plurality of data are included in a data format in a hierarchical layer of the plurality of hierarchical layers converting the data to the electrical signal. The hierarchical layer converting the data to the electrical signal is common to a plurality of communications protocols.

Preferably the plurality of data are each formed of a section detecting a strength of a radio wave received from the first and second radio devices and a section changing the directivity of the first antenna.

Preferably, when the first private key generated does not match the second private key, the first radio device matches the first private key to the second private key.

Preferably the first antenna is provided for the first radio device arranged adjacent to a terminal of an eavesdropper.

Preferably the first and second radio devices employ the first and second private keys to encrypt and decrypt data, and communicate the data.

In the present radio communications system a first antenna having a directivity electrically switchable is used to allow two radio devices to communicate given data. The two radio devices generate receive signal profiles indicative of profiles in strength of a plurality of radio waves detected while changing a directivity of the first antenna to form a plurality of directivities, and from each generated receive signal profile the two radio devices generate private keys. In doing so, each radio device generates a receive signal profile unique to a transmission path formed between the two radio devices. In other words, if a plurality of radio waves communicated between the two radio devices are eavesdropped and a receive signal profile is generated therefrom, the generated receive signal profile is different from those generated at the two terminal devices.

Thus the present invention can contribute to reduced eavesdropping of private keys generated at two radio devices.

Furthermore, in the present radio communications system, an antenna having a directivity electrically switchable is used to allow two radio devices to communicate given data in accordance with a prescribed communications protocol. The two radio devices generate receive signal profiles indicative of profiles in strength of a plurality of radio waves detected while changing a directivity of the antenna to form a plurality of directivities, and from each generated receive signal profile the two radio devices generate private keys. In doing so, each radio device generates a receive signal profile unique to a transmission path formed between the two radio devices. In other words, if a plurality of radio waves communicated between the two radio devices are eavesdropped and a receive signal profile is generated therefrom, the generated receive signal profile is different from those generated at the two terminal devices.

Thus the present invention can contribute to reduced eavesdropping of private keys generated at the two radio devices. Furthermore in the present invention data employed to generate private keys generated in the two radio devices can be communicated in accordance with a prescribed communications protocol.

BRIEF DESCRIPTION OF THE DRAWINGS

FIG. 1 is a schematic diagram of a radio communications system in a first embodiment of the present invention.

FIG. 9 is a schematic diagram of a radio communications system in a second embodiment.

FIGS. 10 and 11 are schematic block diagrams showing internal configurations of one and the other radio devices, respectively, shown in FIG. 9.

FIG. 16 shows a concept of a method of communicating data between two radio devices in the second embodiment.

BEST MODES FOR CARRYING OUT THE INVENTION

Figure 2:
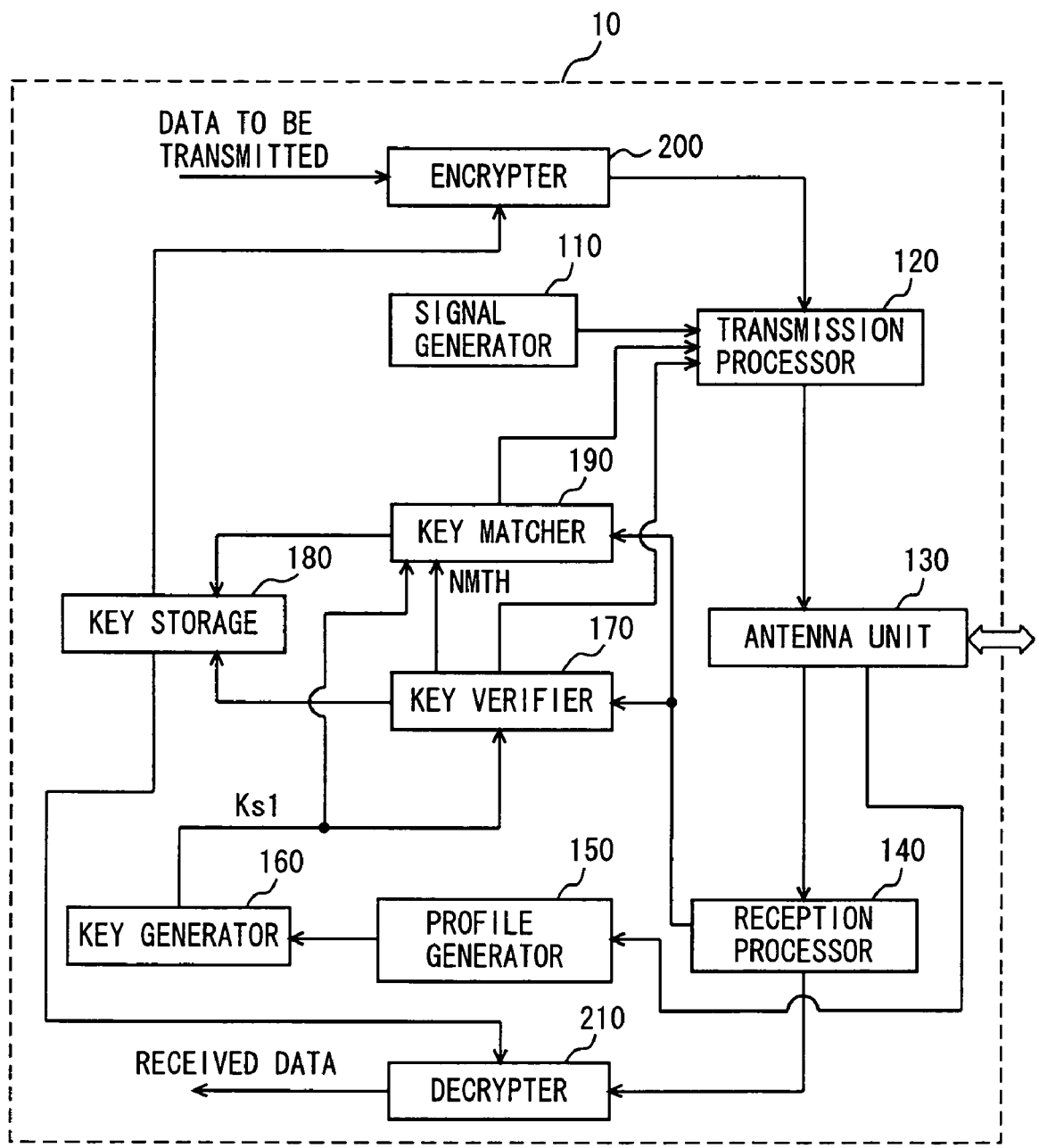
FIGS. 2 and 3 are schematic block diagrams of one and the other radio devices, respectively, shown in FIG. 1.

The present invention will now be described in embodiments with reference to the drawings more specifically. In the figures, identical or like components are identically denoted.

First Embodiment

FIG. 1 is a schematic diagram of a radio communications system in a first embodiment of the present invention. A radio communications system 100 includes radio devices 10, 30, an antenna 11, and an array antenna 20. Radio device 10 is for example a user's mobile communications terminal, and radio device 30 is for example a radio access point.

Antenna 11 is attached to radio device 10. Antenna 11 is an omnidirectional antenna. Array antenna 20 includes antenna elements 21-27. Antenna element 24 is a feeding element while antenna elements 21-23, 25-27 are non-feeding elements. Antenna element 24 is surrounded by antenna elements 21-23, 25-27. By controlling a direct current voltage applied to a varactor diode loaded on non-feeding antenna elements 21-23, 25-27, array antenna 20 is capable of adaptive beam formation.

More specifically, array antenna 20 can change a directivity by varying a DC voltage applied to a varactor diode (not shown) included in radio device 30. As such, array antenna 20 is an antenna having a directivity electrically switchable, and it is attached to radio device 30.

When radio devices 10 and 30 communicate, a radio wave propagates directly between antenna 11 of radio device 10 and array antenna 20 of radio device 30 or propagates as it is affected by an intermediate object assumed to be a reflective object or an obstacle. If intermediate object 40 is a reflective object, a radio wave output from antenna 11 of radio device 10 or array antenna 20 of radio device 30 is reflected by intermediate object 40 and propagates to array antenna 20 or antenna 11. If intermediate object 40 is an obstacle, a radio wave output from antenna 11 or array antenna 20 is diffracted by intermediate object 40 and propagates to array antenna 20 or antenna 11.

Thus a radio wave propagates directly between antenna 11 of radio device 10 and array antenna 20 of radio device 30, reflected by intermediate object 40 and propagates as a reflection of the wave, or diffracted by intermediate object 40 and transmits as a diffracted wave. When a radio wave propagates from antenna 11 or array antenna 20 to array antenna 20 or antenna 11, it has a direct propagation component, a reflected-wave component and a diffracted-wave component mixed together, and what components configure a radio wave propagated from antenna 11 or array antenna 22 to array antenna 20 or antenna 11 determines a characteristic of a transmission path between radio devices 10 and 30.

In the present invention when radio devices 10 and 30 communicate with each other the directivity of array antenna 20 is varied to provide more than one directivity and time division duplex (TDD) or a similar system of communication at a single frequency is employed to communicate given data between radio devices 10 and 30, and radio devices 10 and 30 generate a receive signal profile RSSI indicative of strength of a plurality of electronic waves provided as the directivity of array antenna 20 is varied to provide more than one directivity, and from the generated receive signal profile RSSI radio devices 10, 30 generate a private key.

Radio device 20, 30 uses the generated private key to encrypt and transmit information to the counterpart, and receives encrypted information from the counterpart and decrypts the encrypted information to obtain information.

FIG. 2 is a schematic block diagram of one radio device 10 shown in FIG. 1. Radio device 10 includes a signal generator 110, a transmission processor 120, an antenna unit 130, a reception processor 140, a profile generator 150, a key generator 160, a key verifier 170 verifying whether keys match, a key storage 180, a key matcher 190, an encrypter 200, and a decrypter 210.

When a private key is to be generated, signal generator 110 generates a prescribed signal for transmission to radio device 30, and outputs the generated signal to transmission processor 120. Transmission processor 120 provides modulation, frequency conversion, multiple access, transmit signal amplification, and other similar process involved in transmission. Antenna unit 130 is formed of antenna 11 shown in FIG. 1 and transmits a signal from transmission processor 120 to radio device 30 and receives a signal from radio device 30 and provides the signal to reception processor 140 or profile generator 150.

Reception processor 140 provides receive signal amplification, multiple access, frequency conversion, demodulation, and other similar process involved in reception. Reception processor 140 outputs a signal having undergone the reception process to key verifier 170, key matcher 190 and decrypter 210, as required.

Profile generator 150 receives from antenna unit 130 successively a radio wave or waves provided while changing the directivity of array antenna 20 to provide more than one directivity, and profile generator 150 detects the received plurality of radio waves' strength and from the detected strength generates receive signal profile RSSI and outputs the profile to key generator 160.

Key generator 160 receives receive signal profile RSSI from profile generator 150, generates a private key Ks1 therefrom, and outputs the generated key to key verifier 170 and key matcher 190.

Key verifier 170 communicates a prescribed signal with radio device 30 via transmission processor 120, antenna unit 130 and reception processor 140, and verifies whether private key Ks1 generated by key generator 160 matches a private key Ks2 generated in radio device 30. This is done by a method described later. If key verifier 170 verifies that private key Ks1 matches private key Ks2, private key Ks1 is stored to key storage 180. If key verifier 170 verifies that private key Ks1 does not match private key Ks2, key verifier 170 generates and outputs a mismatch signal NMTH to key matcher 190.

Key storage 180 stores private key Ks1 received from key verifier 170 and key matcher 190. Furthermore, key storage 180 outputs the stored private key Ks1 to encrypter 200 and decrypter 210. Note that key storage 180 may store private key Ks1 temporarily, e.g., only while radio device 10 communicates with radio device 30.

When key matcher 190 receives mismatch signal NMTH from key verifier 170, key matcher 190 employs a method described later to cause private key Ks1 to match private key Ks2, and verifies that the matched private key matches private key Ks2, by the same method as employed in key verifier 170.

Encrypter 200 encrypts transmit data with private key Ks1 stored in key storage 180 and transmits the encrypted data to transmission processor 120. Decrypter 210 decrypts a signal received from reception processor 140 with private key Ks1 received from key storage 180 to generate received data.

Figure 3:
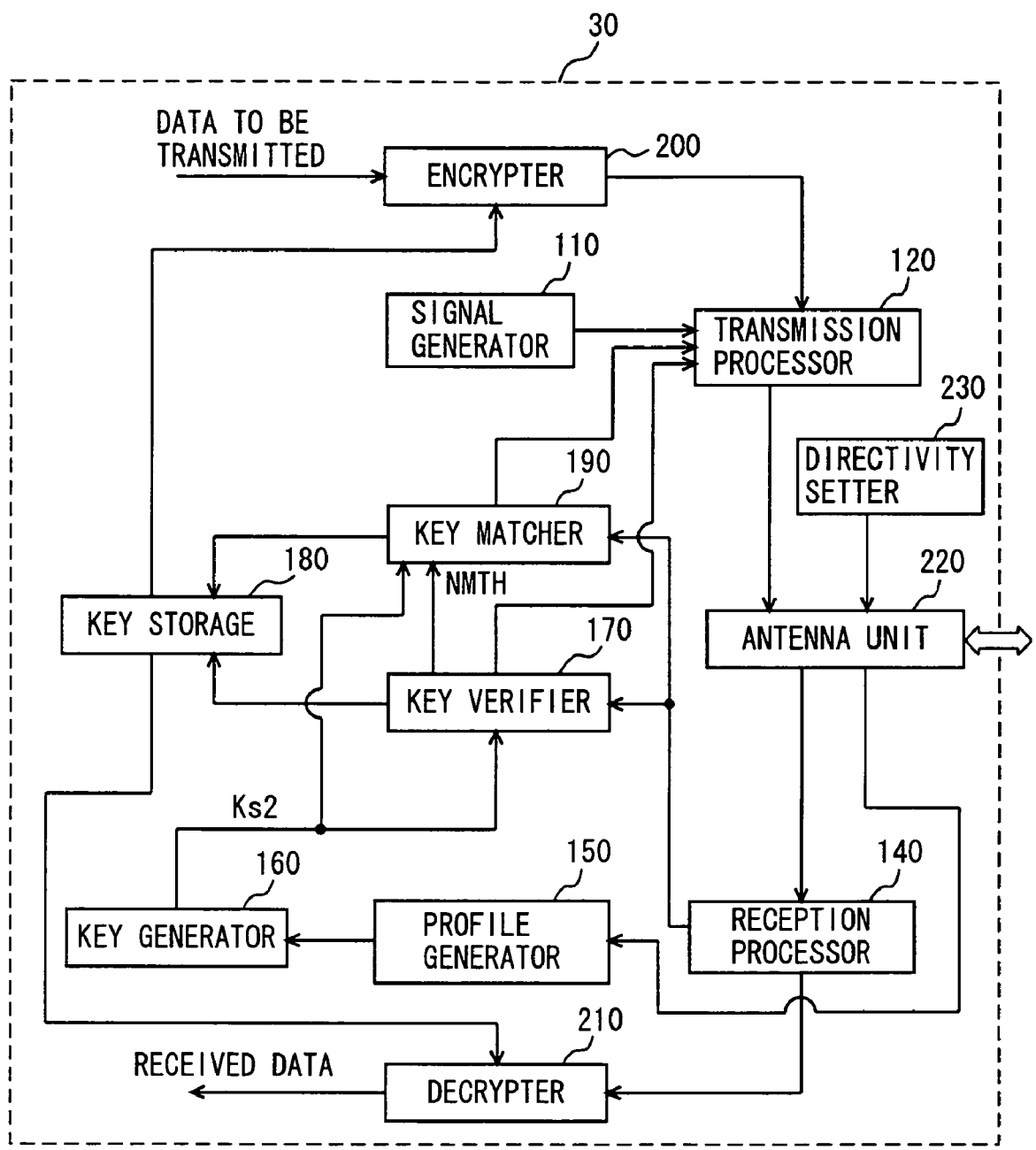

FIG. 3 is a schematic block diagram of the other radio device 30 shown in FIG. 1. Radio device 30 corresponds to radio device 10 with antenna unit 130 replaced with an antenna unit 220 and plus a directivity setter 230.

Antenna unit 220 is formed of array antenna 20 shown in FIG. 1. Antenna unit 220 receives a signal from transmission processor 120 and transmits the signal to radio device 10 with a directivity set by directivity setter 230, and receives a signal from radio device 10 with a directivity set by directivity setter 230 and outputs the signal to reception processor 140 or profile generator 150.

Directivity setter 230 sets the directivity of antenna unit 220. Furthermore, when radio devices 10, 30 generate private keys Ks1, Ks2, directivity setter 230 switches the directivity of array antenna 20 in a method described later, sequentially in a prescribed order.

Note that the radio device 30 profile generator 150 receives from antenna unit 220 sequentially a radio wave or waves provided while changing the directivity of array antenna 20 to provide more than one directivity, and profile generator 150 detects the received plurality of radio waves' strength and therefrom generates receive signal profile RSSI and outputs the generated profile to key generator 160.

Figure 4:
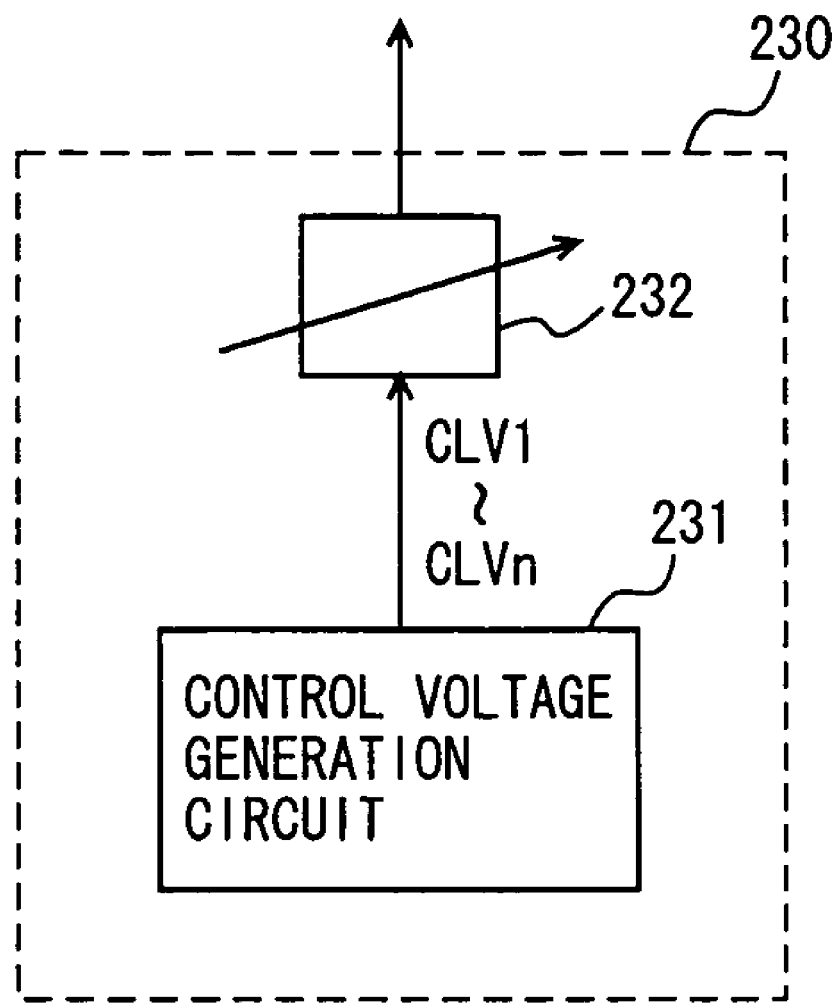
FIG. 4 is a schematic block diagram of a directivity setter shown in FIG. 3.

FIG. 4 is a schematic block diagram of directivity setter 230 shown in FIG. 3. Directivity setter 230 includes a control voltage generation circuit 231 and a varactor diode 232. Control voltage generation circuit 231 sequentially generates and outputs control voltage sets CLV1-CLVn to varactor diode 232, wherein n represents a natural number. Varactor diode 232 operates in response to control voltage sets CLV1-CLVn to vary a capacity loaded on non-feeding antenna elements 21-23, 25-27 to vary the directivity of array antenna 20 to provide more than one directivity.

Figure 5:
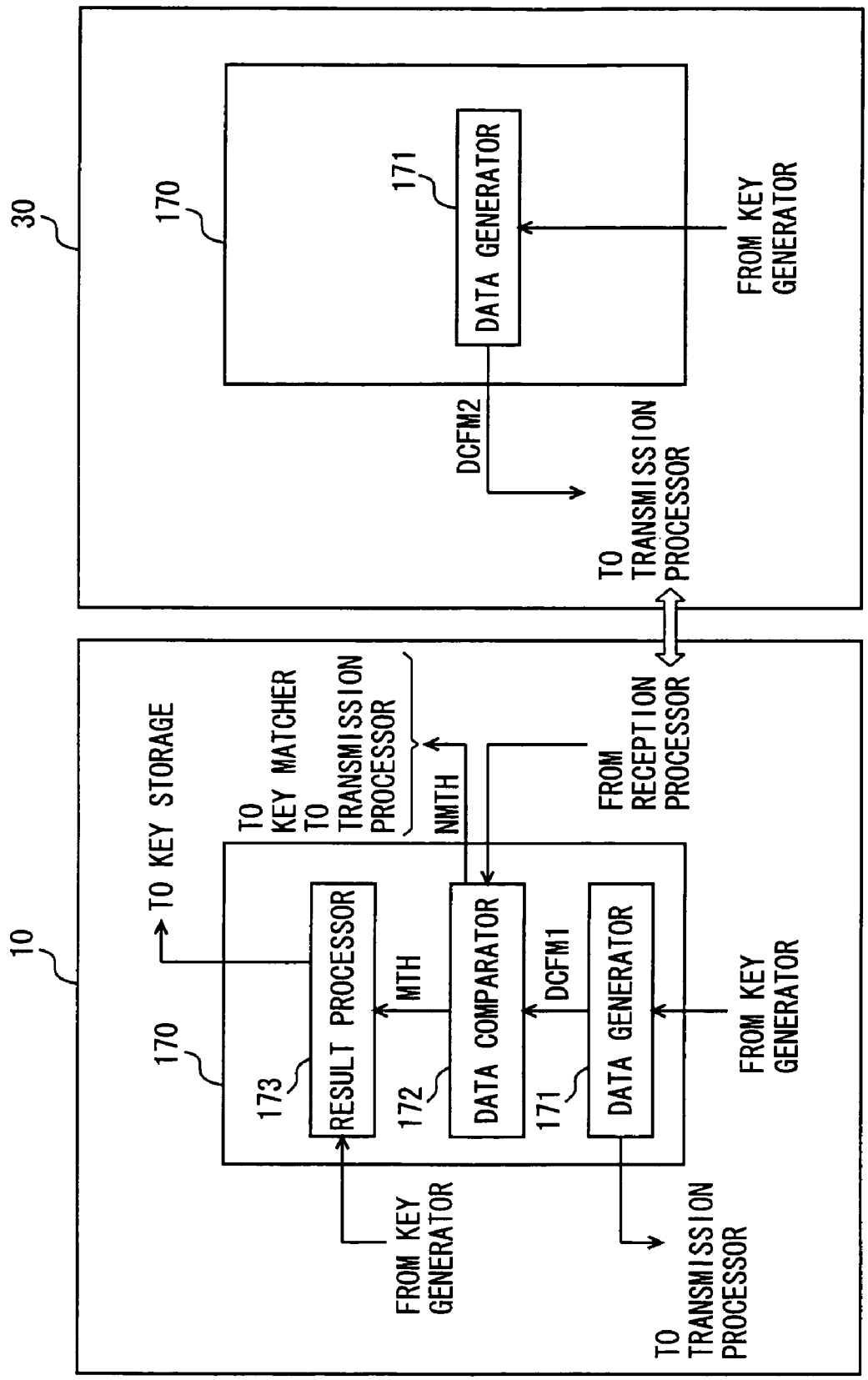
FIG. 5 is a schematic block diagram of a key verifier shown in FIGS. 2 and 3 verifying whether keys match.

FIG. 5 is a schematic block diagram of key verifier 170 shown in FIGS. 2 and 3. Key verifier 170 includes a data generator 171, a data comparator 172, and a result processor 173. Note that while radio devices 10 and 30 have their key verifiers 170s identical in configuration, FIG. 5 shows radio device 30 only with data generator 171 to illustrate an operation performed to verify that private key Ks1 matches private key Ks2.

When data generator 171 receives private key Ks1 from key generator 160, data generator 171 generates key-verifying data DCFM1 used to verify that private key Ks1 matches private key Ks2, and data generator 171 outputs key-verifying data DCFM1 to transmission processor 120 and data comparator 172.

More specifically, data generator 171 generates key-verifying data DCFM1 from private key Ks1 by an irreversible arithmetic operation and a monodirectional arithmetic operation and the like. More specifically, data generator 171 generates key-verifying data DCFM1 by calculating a hash value of private key Ks1 or Ks2.

Data comparator 172 receives key-verifying data DCFM1 from data generator 171 and receives from reception processor 140 key-verifying data DCFM2 generated in radio device 30 by data generator 171. Data comparator 172 compares key-verifying data DCFM1 with key-verifying data DCFM2. If key-verifying data DCFM1 matches key-verifying data DCFM2, data comparator 172 generates a match signal MTH and outputs the signal to result processor 173.

If key-verifying data DCFM1 does not match key-verifying data DCFM2, data comparator 172 generates mismatch signal NMTH and outputs the signal to key matcher 190 for transmission via transmission processor 120 and antenna unit 130 to radio device 30.

If result processor 173 receives match signal MTH from data comparator 172, result processor 173 stores to key storage 180 private key Ks1 received from key generator 160.

Figure 6:
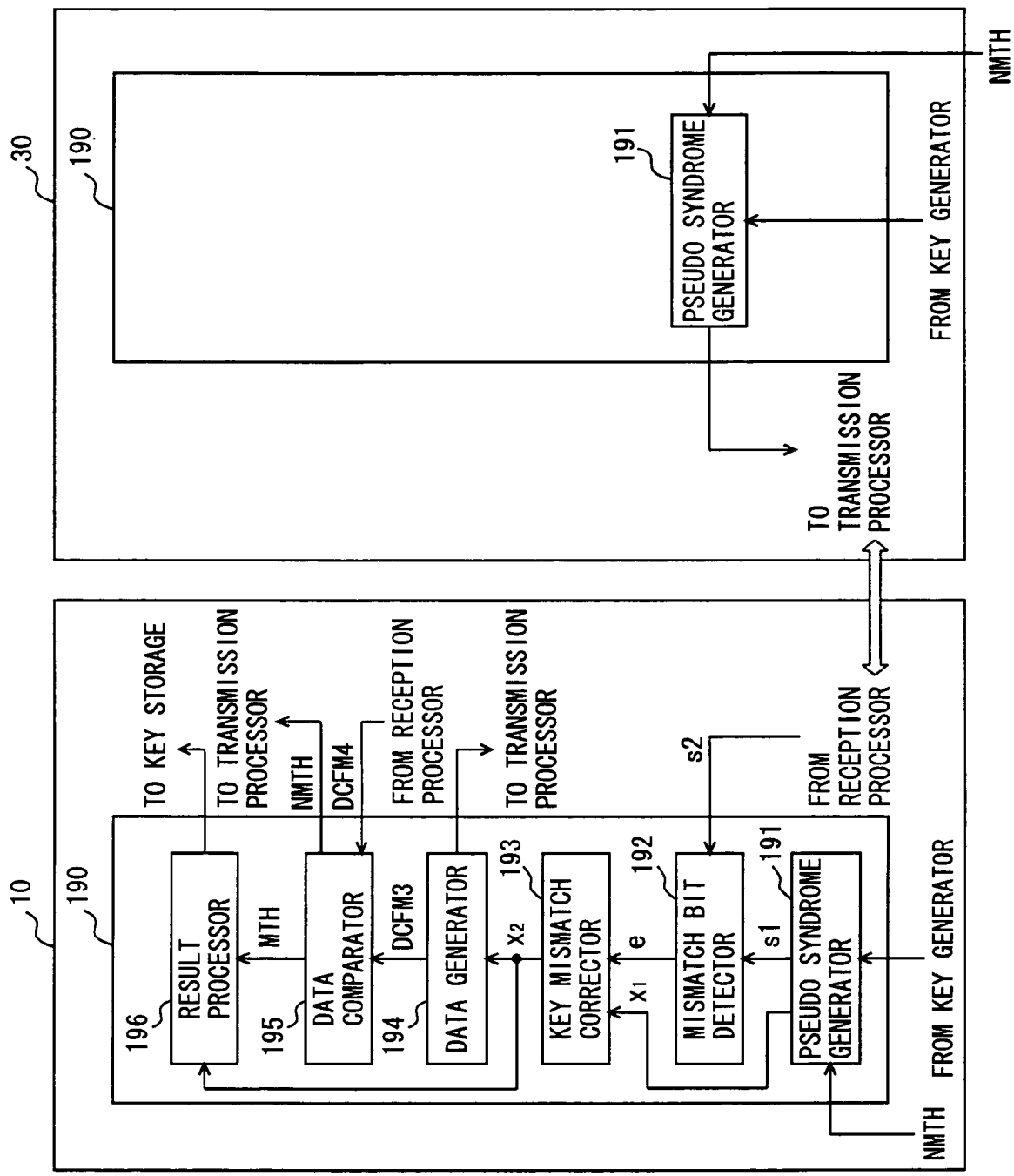
FIG. 6 is a schematic block diagram of a key matcher shown in FIGS. 2 and 3.

FIG. 6 is a schematic block diagram of key matcher 190 shown in FIGS. 2 and 3. Key matcher 190 includes a pseudo syndrome generator 191, a mismatch bit detector 192, a key mismatch corrector 193, a data generator 194, a data comparator 195, and a result processor 196.

Note that while radio devices 10 and 30 have their key matchers 190s identical in configuration, FIG. 6 shows radio device 30 only with pseudo syndrome generator 191 to illustrate an operation performed to cause private key Ks1 to match private key Ks2.

When pseudo syndrome generator 191 receives mismatch signal NMTH from data comparator 172 of key verifier 170, pseudo syndrome generator 191 calculates a syndrome $x_1$ of private key Ks1 received from key generator 160. More specifically, pseudo syndrome generator 191 detects a bit pattern $x_1$ of private key Ks1 and multiplies bit pattern $x_1$ by a check matrix H to calculate a syndrome $s1 = x_1 H^T$. Pseudo syndrome generator 191 then outputs bit pattern $x_1$ to key mismatch corrector 193 and outputs the calculated syndrome $s1 = x_1 H^T$ to mismatch bit detector 192.

Note that these calculations are calculations of mod2 and $H^T$ is a transposition of check matrix H.

Mismatch bit detector 192 receives syndrome $s1$ from pseudo syndrome generator 191 and receives from reception processor 140 a syndrome $s2 = x_2 H^T$ calculated in radio device 30 by pseudo syndrome generator 191. Mismatch bit detector 192 then calculates syndrome $s1$ minus syndrome $s2$, or a difference $s = s1 - s2$.

Note that if private keys Ks1, Ks2's bit pattern difference (a key mismatch's bit pattern) is represented by $e = x_1 - x_2$, $s = eH^T$ is established. For $s = 0$, $e = 0$ and the private key Ks1 bit pattern matches the private key Ks2 bit pattern.

If the calculated difference s is not 0 (i.e., $e \neq 0$), mismatch bit detector 192 outputs a key mismatch's bit pattern e to key mismatch corrector 193.

Key mismatch corrector 193 receives bit pattern $x_1$ from pseudo syndrome generator 191 and the key mismatch's bit pattern e from mismatch bit detector 192. Key mismatch corrector 193 subtracts the key mismatch's bit pattern e from bit pattern $x_1$ to calculate the counterpart private key's bit pattern $x_2 = x_1 - e$.

Thus key matcher 190 determines that a mismatch between private keys Ks1 and Ks2 is an error, and by an application of error correction resolves the mismatch between the keys.

This method of matching private keys can fail to match keys if the key mismatch's bit count is beyond error correction capability. Accordingly, after a key matching operation is performed, whether the keys match or not must be verified.

When data generator 194 receives the matched key $x_2 = x_1 - e$ from key mismatch collector 193, data generator 194 uses key $x_2$ to generate and output key-verifying data DCFM3 to data comparator 195. Furthermore, data generator 194 transmits key-verifying data DCFM3 via transmission processor 120 and antenna unit 130 to radio device 30.

Note that data generator 194 generates key-verifying data DCFM3 by the same method as used in key verifier 170 by data generator 171 to generate key-verifying data DCFM1.

Data comparator 195 receives key-verifying data DCFM3 from data generator 194 and receives from reception processor 140 key-verifying data DCFM4 generated in radio device 30, and compares key-verifying data DCFM3 with key-verifying data DCFM4.

If data DCFM3 matches data DCFM4, data comparator 195 generates and outputs match signal MTH to result processor 196.

If data DCFM3 does not match data DCFM4, data comparator 195 generates and transmits mismatch signal NMTH via transmission processor 120 and antenna unit 130 to radio device 30.

When result processor 196 receives match signal MTH from data comparator 195, result processor 196 stores to key storage 180 key $x_2 = x_1 - e$ received from key mismatch corrector 193.

Thus data generator 194, data comparator 195 and result processor 196 use the same method as that of verification in key verifier 170 to verify that a matched key matches.

Figure 7:
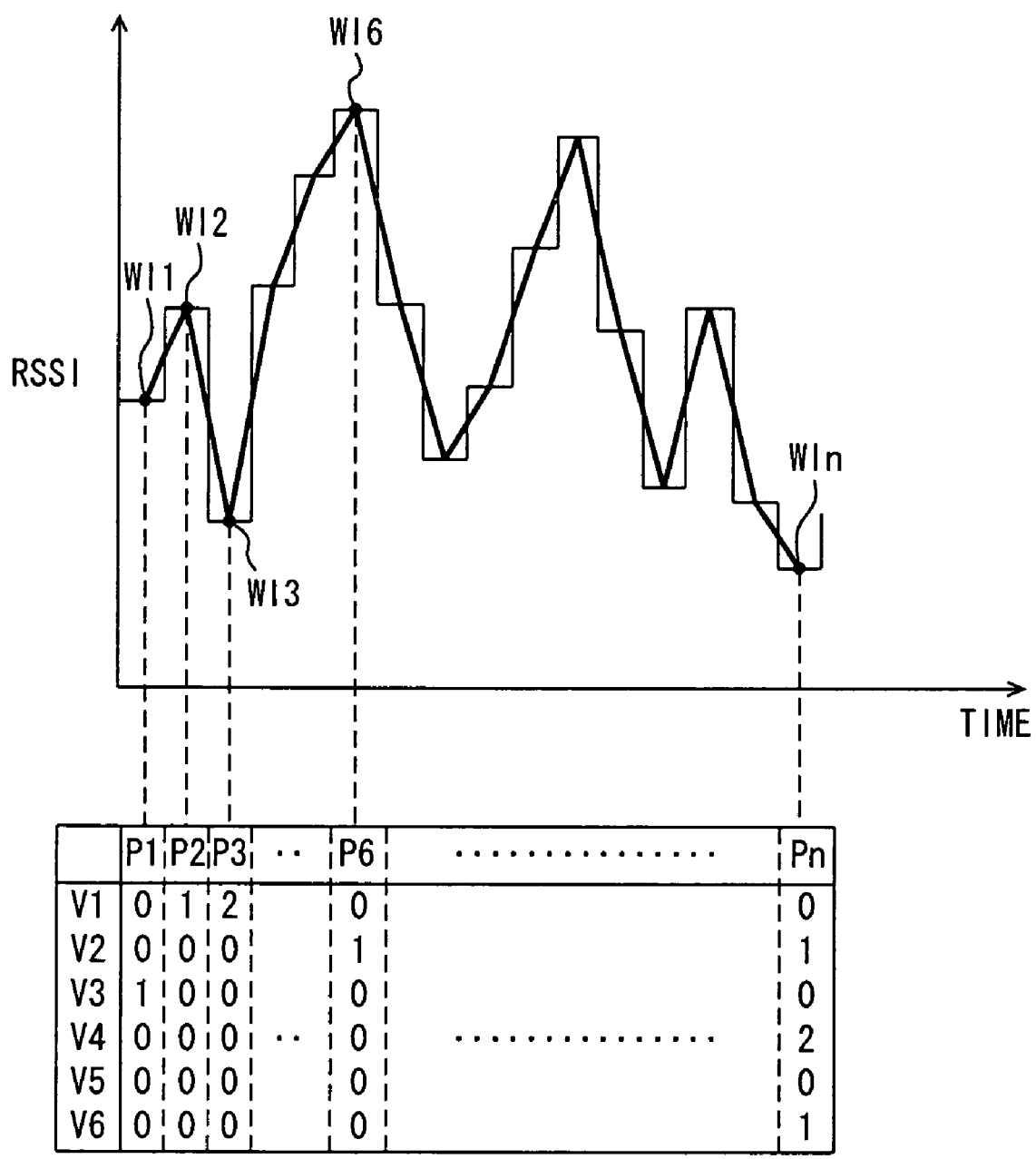
FIG. 7 shows a concept of a receive signal profile RSSI.

FIG. 7 shows a concept of receive signal profile RSSI. Control voltage generation circuit 231 of directivity setter 230 sequentially generates control voltage sets CLV1-CLVn each formed of voltages V1-V6 and outputs the sets to varactor diode 232. Voltages V1-V6 are voltages used to vary capacities loaded to antenna elements 21-23, 25-27, respectively, and varied in a range of 0-20V.

Varactor diode 232 operates in response to control voltage set CLV1 formed of a pattern P1 to set the directivity of array antenna 20 to a particular directivity, and with the set directivity of array antenna 20 receives a radio wave from radio device 10 and supplies the radio wave to profile generator 150. Profile generator 150 detects a strength WI1 of the radio wave received from array antenna 20 (antenna unit 220).

Then, varactor diode 232 operates in response to control voltage set CLV2 formed of a pattern P2 to set the directivity of array antenna 20 to a different directivity, and with the set directivity array antenna 20 receives a radio wave from radio device 10 and supplies the radio wave to profile generator 150. Profile generator 150 detects a strength WI2 of the radio wave received from array antenna 20 (antenna unit 220).

Similarly, varactor diode 232 operates in response to control voltage sets CLV3-CLVn formed of a pattern P3-Pn, respectively, to vary the directivity of array antenna 20 sequentially, and with each set directivity array antenna 20 receives the radio wave from radio device 10 and supplies the radio wave to profile generator 150. Profile generator 150 detects strength WI3-WIn of the radio wave received from array antenna 20 (antenna unit 220).

Profile generator 150 generates receive signal profile RSSI indicating a strength profile formed of strength WI1-WIn and outputs the profile to key generator 160.

When pattern P1-Pn are applied to switch the directivity of array antenna 20 sequentially to provide more than one directivity and radio device 30 transmits data to radio device 10, profile generator 150 of radio device 10 generates receive signal profile RSSI.

Key generator 160 receives receive signal profile RSSI from profile generator 150 and from the profile detects a maximum strength WImax (=WI6). Key generator 160 then standardizes receive signal profile RSSI by maximum strength WImax (=WI6) to multivalue each strength WI1-WIn. Key generator 160 detects each multivalued value and generates private key Ks1 or Ks2 with each detected value serving as a bit pattern.

Figure 8:
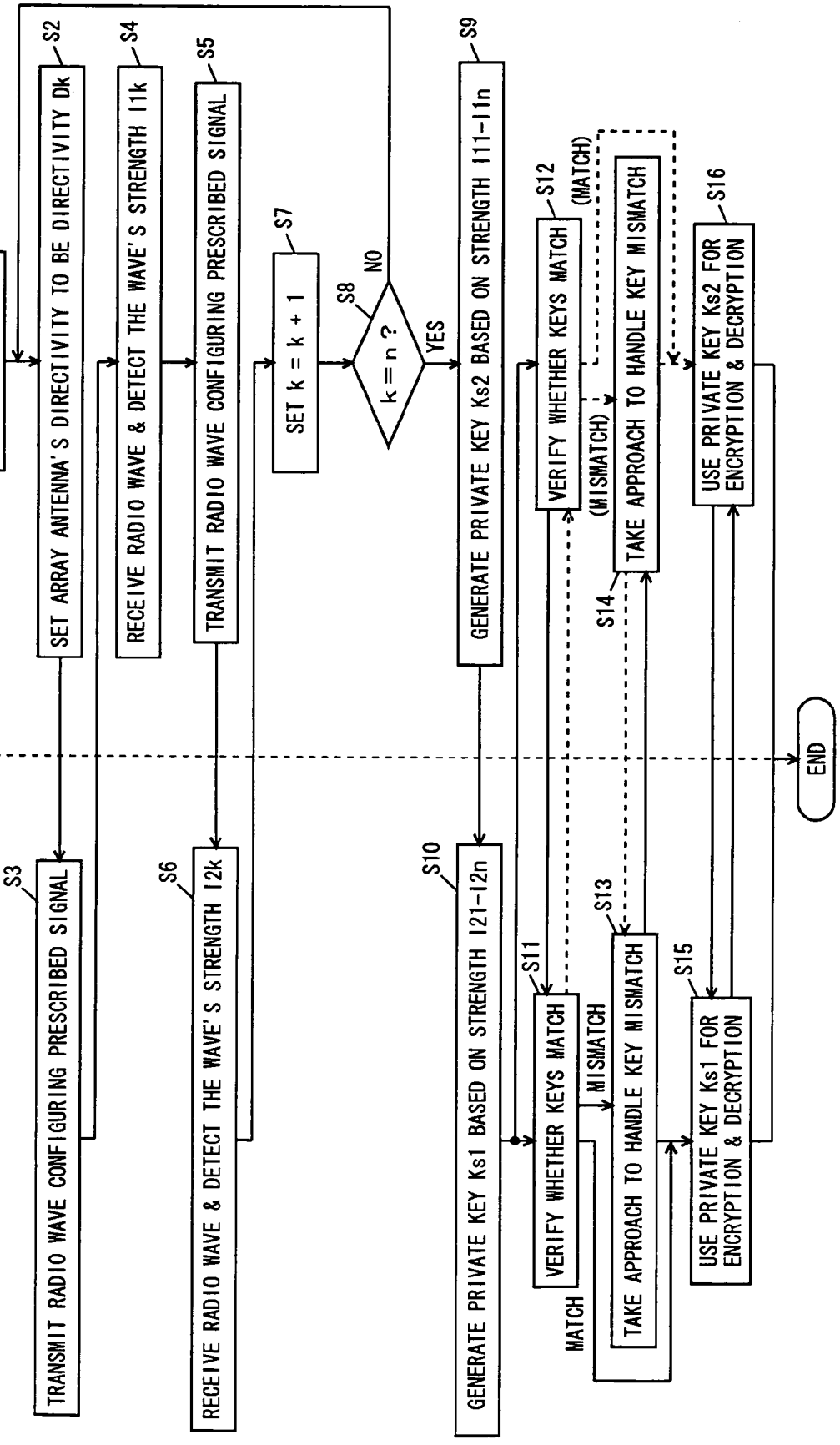
FIG. 8 is a flow chart for illustrating an operation performed to allow communication between two radio devices shown in FIG. 1.

FIG. 8 is a flow chart for illustrating an operation performed to allow communication between two radio devices 10 and 30 shown in FIG. 1. When a series of operations starts, transmission processor 120 of radio device 30 sets k=1 (step S1). Then, directivity setter 230 uses pattern P1 to set the directivity of array antenna 20 to a specific directivity (step S2).

Subsequently signal generator 110 of radio device 10 generates and outputs a prescribed signal to transmission processor 120. Transmission processor 120 modulates or similarly processes the prescribed signal and transmits a radio wave configuring the prescribed signal via antenna 11 to radio device 30 (step S3).

In radio device 30 array antenna 20 receives the radio wave from radio device 10 and outputs the received radio wave to profile generator 150. Profile generator 150 detects strength I1k of the radio wave received from array antenna 20 (step S4).

Subsequently signal generator 110 of radio device 30 generates and outputs a prescribed signal to transmission processor 120. Transmission processor 120 modulates or similarly processes the prescribed signal and transmits a radio wave configuring the prescribed signal via array antenna 20 to radio device 10 (step S5).

In radio device 10 antenna 11 receives the radio wave from radio device 30 and outputs the received radio wave to profile generator 150. Profile generator 150 detects strength I2k of the radio wave received from antenna 11 (step S6).

Subsequently transmission processor 120 of radio device 30 sets k=k+1 (step S7) and a decision is made as to whether k=n (step S8). If k≠n then steps S2-S8 are repeated. More specifically, the directivity of array antenna 20 is varied by patterns P1-Pn to provide n directivities and between antenna 11 of radio device 10 and array antenna 20 of radio device 30 a radio wave configuring a prescribed signal is communicated, and until strength I1l-I1n and I2l-I2n are detected, steps S2-S8 are repeated.

If at step S8 a decision is made that k=n, then in radio device 30 profile generator 150 generates receive signal profile RSSI1 from strength I1l-I1n and outputs the profile to key generator 160.

Key generator 160 detects a maximum strength WImax1 from receive signal profile RSSI1 and by the detected maximum strength WImax1 standardizes receive signal profile RSSI1 and multivalues strength I1l-I1n. Then, key generator 160 generates private key Ks2 with each multivalued value serving as a bit pattern (step S9).

Furthermore, profile generator 150 of radio device 10 generates a receive signal profile RSSI2 from strength I2l-I2n and outputs the profile to key generator 160. Key generator 160 detects a maximum strength WImax2 from receive signal profile RSSI2 and by the detected maximum strength WImax2 standardizes receive signal profile RSSI2 and multivalues strength I1l-I1n. Then, key generator 160 generates private key Ks1 with each multivalued value serving as a bit pattern (step S10).

Subsequently in radio device 10 key generator 160 outputs private key Ks1 to key verifier 170. Data generator 171 of key verifier 170 employs the above described method to generate and output key-verifying data DCFM1 to transmission processor 120 and data comparator 172. Transmission processor 120 subjects data DCFM1 to modulation or similar process and transmits the data via antenna unit 130 to radio device 30.

Antenna unit 130 receives from radio device 30 key-verifying data DCFM2 generated in radio device 30, and outputs data DCFM2 to reception processor 140. Reception processor 140 subjects data DCFM2 to a prescribed process and outputs the data to data comparator 172 of key verifier 170.

Data comparator 172 compares data DCFM1 received from data generator 172 with data DCFM2 received from reception processor 140. If data DCFM1 matches data DCFM2, data comparator 172 generates and outputs match signal MTH to result processor 173. In response to match signal MTH, result processor 173 stores to key storage 180 private key Ks1 received from key generator 160.

If data DCFM1 does not match data DCFM2, data comparator 172 generates and outputs mismatch signal NMTH to transmission processor 120 and key matcher 190. Transmission processor 120 transmits mismatch signal NMTH via antenna unit 130 to radio device 30. Radio device 30 detects that radio device 10 has verified that private keys Ks1 and Ks2 mismatch.

Key verification in radio device 10 thus ends (step S11).

Note that the key verification in radio device 10 may be replaced by that in radio device 30 (step S12).

If at step S11 it is verified that private keys Ks1 and Ks2 mismatch, then in radio device 10 pseudo syndrome generator 191 of key matcher 190 receives mismatch signal NMTH from key verifier 170. In response to mismatch signal NMTH, pseudo syndrome generator 191 detects bit pattern $x_1$ of private key Ks1 received from key generator 160 and calculates the detected bit pattern $x_1$'s syndrome $s1=x_1 H^T$.

Pseudo syndrome generator 191 outputs the calculated syndrome $s=x_1 H^T$ to mismatch bit detector 192 and outputs bit pattern $x_1$ to key mismatch corrector 193.

Radio device 30 at step S11 receives mismatch signal NMTH from radio device 10 and in response to mismatch signal NMTH calculates and transmits syndrome $s2=x_2 H^T$ to radio device 10.

Antenna unit 130 of radio device 10 receives syndrome $s2=x_2 H^T$ from radio device 30 and outputs it to reception processor 140. Reception processor 140 subjects syndrome $s2=x_2 H^T$ to a prescribed process and outputs it to key matcher 190.

The key matcher 190 mismatch bit detector 192 receives from reception processor 140 syndrome $s2=x_2 H^T$ generated in radio device 30. Then mismatch bit detector 192 calculates syndrome $s1=x_1 H^T$ generated in radio device 10 minus syndrome $s2=x_2 H^T$ generated in radio device 30, i.e., a difference $s=s1-s2$.

Subsequently, mismatch bit detector 192 verifies that s≠0 and calculates key mismatch's bit pattern $e=x_1-x_2$ based on $s=eH^T$ and outputs the calculated key mismatch's bit pattern e to key mismatch corrected 193.

Key mismatch corrector 193 uses bit pattern $x_1$ received from pseudo syndrome generator 191 and the key mismatch's bit pattern e received from mismatch bit detector 192 to calculate bit pattern $x_2=x_1-e$ of private key Ks2 generated in radio device 30.

Then data generator 194, data comparator 195 and result processor 196 verifies that the matched key $x_2=x_1-e$ matches by the same operation as performed in key verifier 170 verifying that a key matches.

Thus an approach to handle a key mismatch ends (step S13).

Note that the approach effected in radio device 10 to address a key mismatch may be replaced with that effected in radio device 30 to address a key mismatch (step S14).

If at step S11 it is verified that private key Ks1 matches private key Ks2 or at step S13 the approach is effected to address a key mismatch, encrypter 200 reads private key Ks1 from key storage 180 and encrypts transmit data, and outputs the encrypted transmit data to transmission processor 120. Transmission processor 120 subjects the encrypted transmit data to modulation or the like and transmits the data via antenna unit 130 to radio device 30.

Furthermore, antenna unit 130 receives encrypted transmit data from radio device 30 and outputs the received data to reception processor 140. Reception process 140 subjects the data to a prescribed process and then outputs the data to decrypter 210.

Decrypter 210 decrypts the data to obtain received data.

Thus the encryption and decryption by private key Ks1 ends (step S15).

Radio device 30 also performs the same operation as radio device 10 to provide encryption and decryption with private key Ks2 (step S16) and the series of operations ends.

The steps S3 and S4 operations are operations which transmit the radio wave from antenna 11 of radio device 10 to array antenna 20 of radio device 30 to generate receive signal profile RSSI1 in radio device 30 and also detect the radio wave's strength I1k in radio device 30, and the steps S5 and S6 operations are operations which transmit the radio wave from array antenna 20 of radio device 30 to antenna 11 of radio device 10 to generate receive signal profile RSSI2 in radio device 10 and also detect the radio wave's strength I2k in radio device 10, and the radio wave from antenna 11 of radio device 10 to array antenna 20 of radio device 30 configuring a prescribed signal and that from array antenna 20 of radio device 30 to antenna 11 of radio device 10 configuring prescribed signal are transmitted alternately with the directivity of array antenna 20 set to a single directivity. In other words, the radio wave configuring the prescribed signal is transmitted and received between antenna 11 and array antenna 20 by time division duplex (TDD) or similar system of transmission and reception at a single frequency.

As such, array antenna 20 can be set to have a particular directivity and from antenna 11 of radio device 10 to array antenna 20 of radio device 30 the radio wave forming a prescribed signal can be transmitted and radio device 30 can detect the wave's strength I1k, and immediately thereafter the radio wave configuring the same prescribed signal can be transmitted from array antenna 20 of radio device 30 to antenna 11 of radio device 10 and radio device 10 can detect the wave's strength I2k. Thus between radio devices 10 and 30 the same transmission path characteristic can be ensured to communicate between radio devices 10 and 30 the radio wave configuring a prescribed signal and by radio wave's reversibility the radio wave's strength I1l-I1n can be matched to the radio wave's strength I2l-I2n, respectively, and private key Ks1 generated in radio device 10 can be readily matched to private key Ks2 generated in radio device 30.

Furthermore, as the radio wave configuring the prescribed signal is communicated between radio devices 10 and 30 by a system of communication at a single frequency, such as time division duplex (TDD), radio wave's interference can be reduced and the radio wave configuring the prescribed signal can be communicated between radio devices 10 and 30 via a single array antenna 20.

Furthermore, array antenna 20 is set to have a particular directivity to communicate between radio devices 10 and 30 the radio wave configuring the prescribed signal and generate receive signal profiles RSSI1, RSSI2 to generate private keys Ks1, Ks2. As such, if a eavesdropper 50 is put in the vicinity of radio device 30 having array antenna 20 attached thereto, as shown in FIG. 1, eavesdropper 50 cannot readily eavesdrop private keys Ks1, Ks2.

More specifically, eavesdropper 50 receives a radio wave from antenna 11 and array antenna 20 through antenna 51. However, array antenna 20 has a directivity set to be each directivity to transmit and receive a radio wave. As such, the radio wave transmitted and received between antenna 11 and array antenna 20 is different from that transmitted and received between antenna 11 or array antenna 20 and antenna 51. As such, eavesdropper 50 cannot transmit or receive the same radio wave as that transmitted from and received by radio device 30 nor obtain the same strength as radio wave's strength I1k, and as a result cannot eavesdrop private keys Ks1, Ks2.

Thus the present invention is characterized in that array antenna 20 having a directivity electrically switchable is attached to radio device 30 arranged in the vicinity of eavesdropper 50.

Furthermore, key-verifying data DCFM1-DCFM4 are generated by subjecting private keys Ks1, Ks2 to irreversible arithmetic operation or monodirectional operation, and if key-verifying data DCFM1-DCFM4 are eavesdropped the possibility that private keys Ks1, Ks2 are decrypted by an unwanted party can be significantly limited.

Furthermore, syndromes s1, s2 are obtained by multiplying keys $x_1$, $x_2$ indicating the private keys Ks1, Ks2 bit pattern by the check matrix H transposition $H^T$. As such, if syndromes s1, s2 are eavesdropped, information's bit pattern is not immediately conjectured unless a particular coding is assumed. Thus eavesdropping can be reduced and private key can be matched.

Note that radio devices 10 and 30 communicate in an operation which is in effect performed by a central processing unit (CPU): radio device 10 has a CPU which reads from a read only memory (ROM) a program including the steps S3, S6, S10, S11, S13, and S15 in FIG. 8 and radio device 30 has a CPU which reads from ROM a program including the steps S1, S2, S4, S5, S7, S8, S9, S12, S14, and S16 in FIG. 8 and the radio devices 10 and 30 respective CPUs execute the read programs and follow the flow chart in FIG. 8 to communicate between radio devices 10 and 30.

As such, the ROM corresponds to a computer (CPU) readable storage medium having a program recorded therein and executed to cause a computer (CPU) to perform an operation allowing communications between radio devices 10 and 30.

The program including each step shown in FIG. 8 is furthermore a program causing the computer (CPU) to perform communications between radio devices 10 and 30 in accordance with a radio wave or waves received while changing the directivity of array antenna 20 to form a plurality of directivities sequentially.

In the above description, array antenna 20 having a directivity electrically switchable is attached to radio device 30 alone. Alternatively, array antenna 20 may be attached to both radio devices 10 and 30.

More specifically in the present invention array antenna 20 is only required to be attached to at least one of the two radio devices 10 and 30, and preferably the radio device having array antenna 20 attached thereto is arranged in the vicinity of eavesdropper 50.

Furthermore in the present invention private keys Ks1, Ks2 may have a key length determined by the environment in which radio devices 10 and 30 communicate. More specifically, if the environment is susceptible to eavesdropping, private keys Ks1, Ks2 are relatively increased in key length, and if the environment is less susceptible to eavesdropping, private keys Ks1, Ks2 are relatively reduced in key length.

Furthermore, private keys Ks1, Ks2 may be varied in key length periodically.

Furthermore, private keys Ks1, Ks2 may be varied in key length to accommodate confidentiality of information communicated between radio devices 10 and 30. More specifically, the information's confidentiality is high, private keys Ks1, Ks2, are relatively increased in key length, and if the information's confidentiality is low, private keys Ks1, Ks2 are relatively reduced in key length.

The key length is controlled by the number adopted to vary the directivity of array antenna 20 i.e., the number of control voltage sets CLV1-CLVn, since private keys Ks1, Ks2 have a bit pattern formed of the number of detected radio waves' strength I1/-I1n, I2/-I2n, which is equal to that adopted to vary the directivity of array antenna 20. In other words, by the number of control voltage sets CLV1-CLVn the private keys Ks1, Ks2 key length can be controlled.

Thus in the present invention private keys Ks1, Ks2 has a key length determined by the number adopted to vary the directivity of array antenna 20 having directivity electrically switchable.

Furthermore in the above description a private key is generated between two radio devices, i.e., one radio device communicates with another radio device. However, the present invention is not limited thereto and is also applicable to a case in which a single radio device communicates with a plurality of radio devices. In that case, the single radio device varies for each counterpart a pattern applied to switch the directivity of array antenna 20 to generate a private key. The single radio device can fix the pattern to be a single pattern and thus generate a private key between itself and the plurality of radio devices (the plurality of radio devices are installed at different locations and thus have different transmission paths, respectively, to communicate with the single radio device so that for each counterpart a different private key can be generated). To effectively reduce eavesdropping, however, it is preferable that for each counterpart the pattern be changed and a private key be thus generated.

Second Embodiment

FIG. 9 schematically shows a radio communications system in a second embodiment. Radio communications system 200 corresponds to the FIG. 1 radio communications system 100 except that radio devices 10 and 30 are replaced with radio devices 10A and 30A.

Radio device 10A has antenna 11 attached thereto and radio device 30A has array antenna 20 attached thereto. Radio device 10A communicates with radio device 30A in accordance with IEEE802.11b or IEEE802.11g, a protocol of wireless radio local area network (LAN).

FIG. 10 is a schematic block diagram of an internal configuration of one radio device 10A shown in FIG. 9. Radio device 10A is identical to radio device 10 except that signal generator 10 is replaced with a signal generator 110A.

Signal generator 110A generates a prescribed signal to be transmitted to radio device 30A to generate a private key, and outputs the generated prescribed signal to transmission processor 120. Transmission processor 120 receives encrypted data from encrypter 200 and subjects the received encrypted data to modulation, frequency conversion, amplification and the like for transmission from antenna unit 130.

Note that in the second embodiment when transmission processor 120 receives a prescribed signal from signal generator 110A, transmission processor 120 includes the prescribed signal in a data format configuring a physical layer of a prescribed communications protocol IEEE802.11b (or IEEE802.11g) and subjects it to modulation, frequency conversion, amplification and the like for transmission from antenna unit 130.

Figure 11:
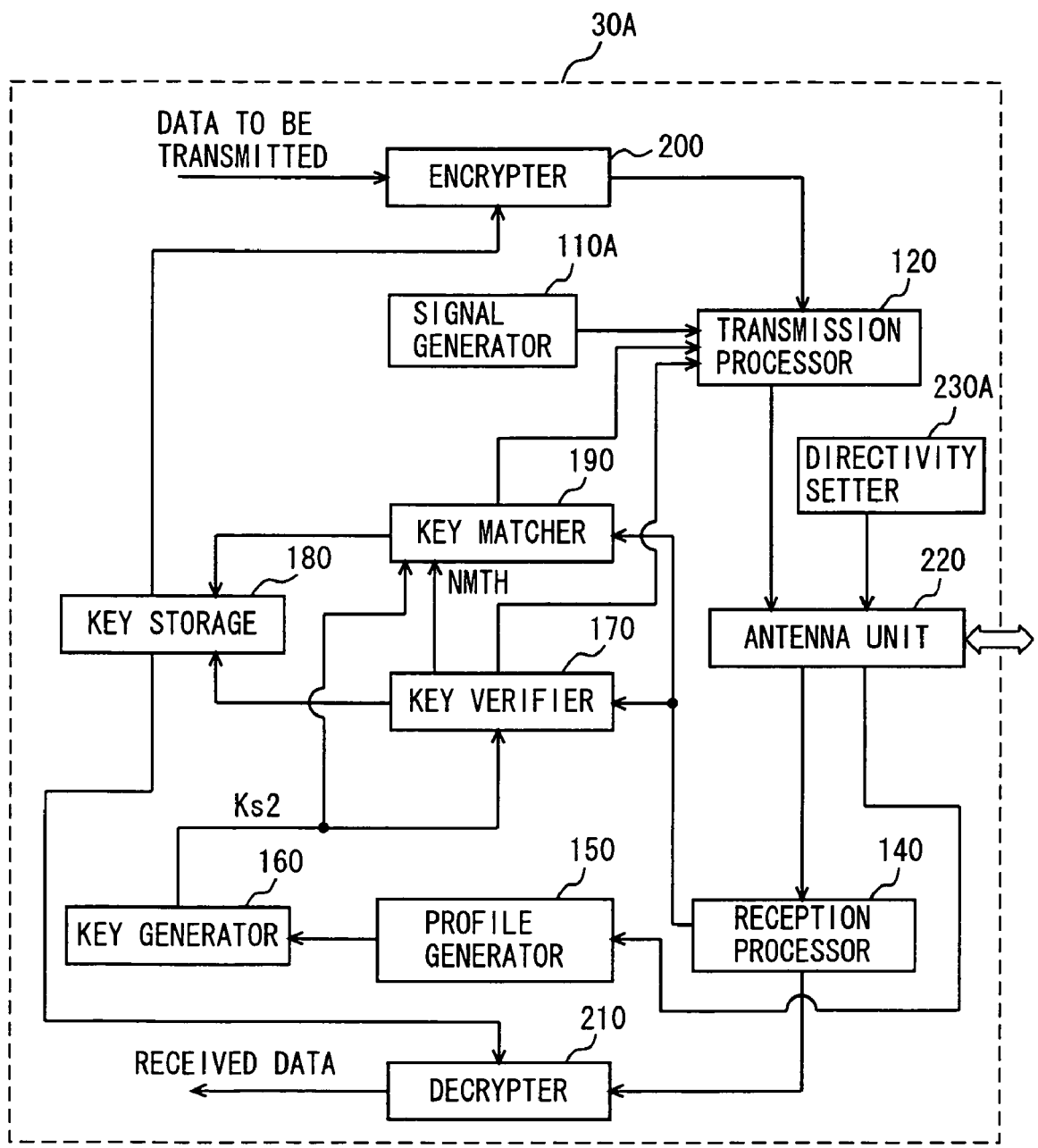

FIG. 11 is a schematic block diagram showing an internal configuration of the other radio device 30A shown in FIG. 9. Radio device 30A is identical to radio device 30 except that signal generator 110 is replaced with signal generator 110A and directivity setter 230 is replaced with a directivity setter 230A. Signal generator 110A is as has been described above.

In the second embodiment antenna unit 220 receives a signal from transmission processor 120 and transmits the signal to radio device 10A with omni-directivity or directivity set by directivity setter 230A. More specifically, antenna unit 220 functions as an omnidirectional antenna or a directional antenna, and receives a signal from transmission processor 120 and transmits the signal to radio device 10A. Furthermore antenna unit 220 receives a signal from radio device 10A with a directivity set by directivity setter 230A and outputs the signal to reception processor 140 or profile generator 150.

Directivity setter 230A functions to set the directivity of antenna unit 220 and when radio devices 10A, 30A generate private keys Ks1, Ks2, directivity setter 230A employs a method described later to switch the directivity of antenna unit 220 in a predetermined order sequentially or set antenna unit 220 to be omnidirectional.

Figure 12:
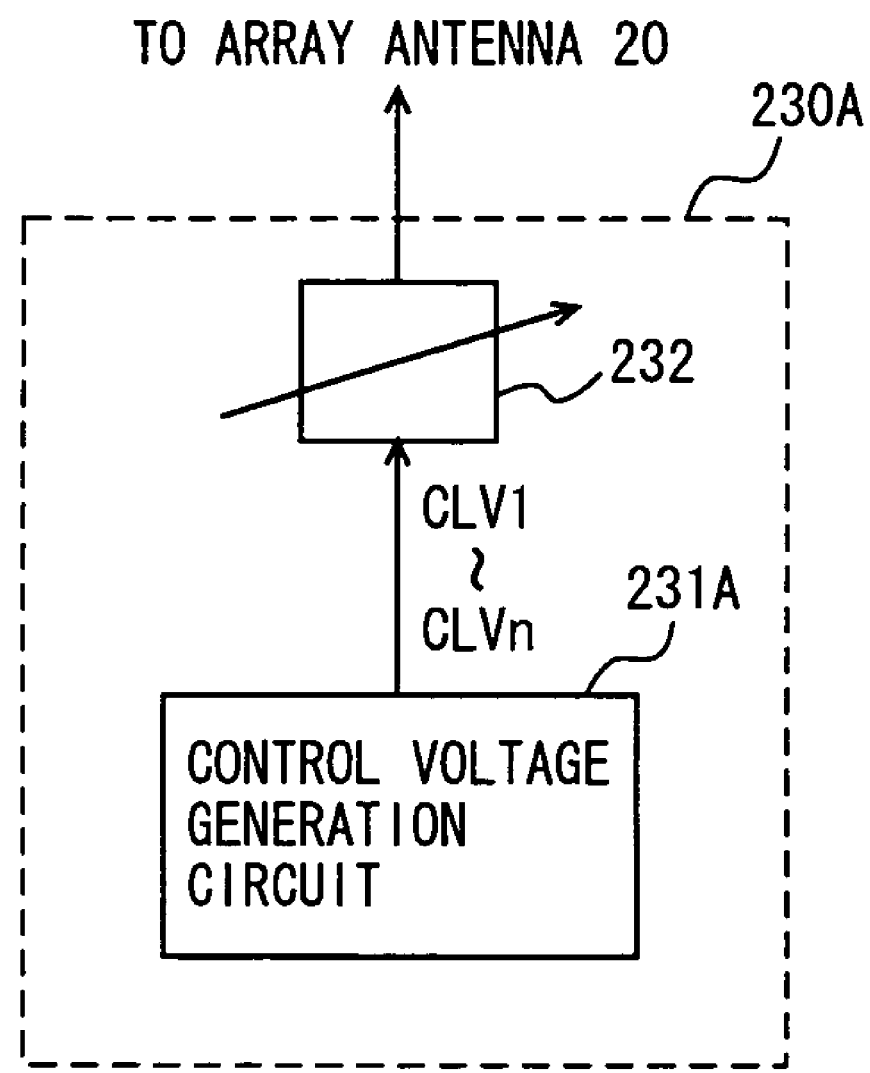
FIG. 12 is a functional block diagram of a directivity setter shown in FIG. 11.

FIG. 12 is a functional block diagram of directivity setter 230A shown in FIG. 12. Directivity setter 230A is identical to directivity setter 230 except that control voltage generation circuit 230 is replaced with a control voltage generation circuit 231A.

Directivity setter 230A sequentially generates and outputs control voltage sets CLV1-CLVn to a varactor diode 232, wherein n is a natural number. Varactor diode 232 responds to control voltage sets CLV1-CLVn to vary a capacitance loaded non-feeding elements or antenna elements 21-23, 25-27 to cause array antenna 20 to function as an omnidirectional antenna or a directional antenna. In other words, varactor diode 232 responds to control voltage sets CLV1-CLVn to vary non-feeding elements 21-23, 25-27 in reactance to cause array antenna 20 to function as the omnidirectional antenna or the directional antenna. In that case when control voltage sets CLV1-CLVn are all 0V, array antenna 20 functions as the omnidirectional antenna, and varactor diode 232 responds to a plurality of different sets of control voltage sets CLV1-CLVn to vary non-feeding elements 21-23, 25-27 in reactance sequentially to vary the directivity of array antenna 20 to provide more than one directivity sequentially.

Figure 13:
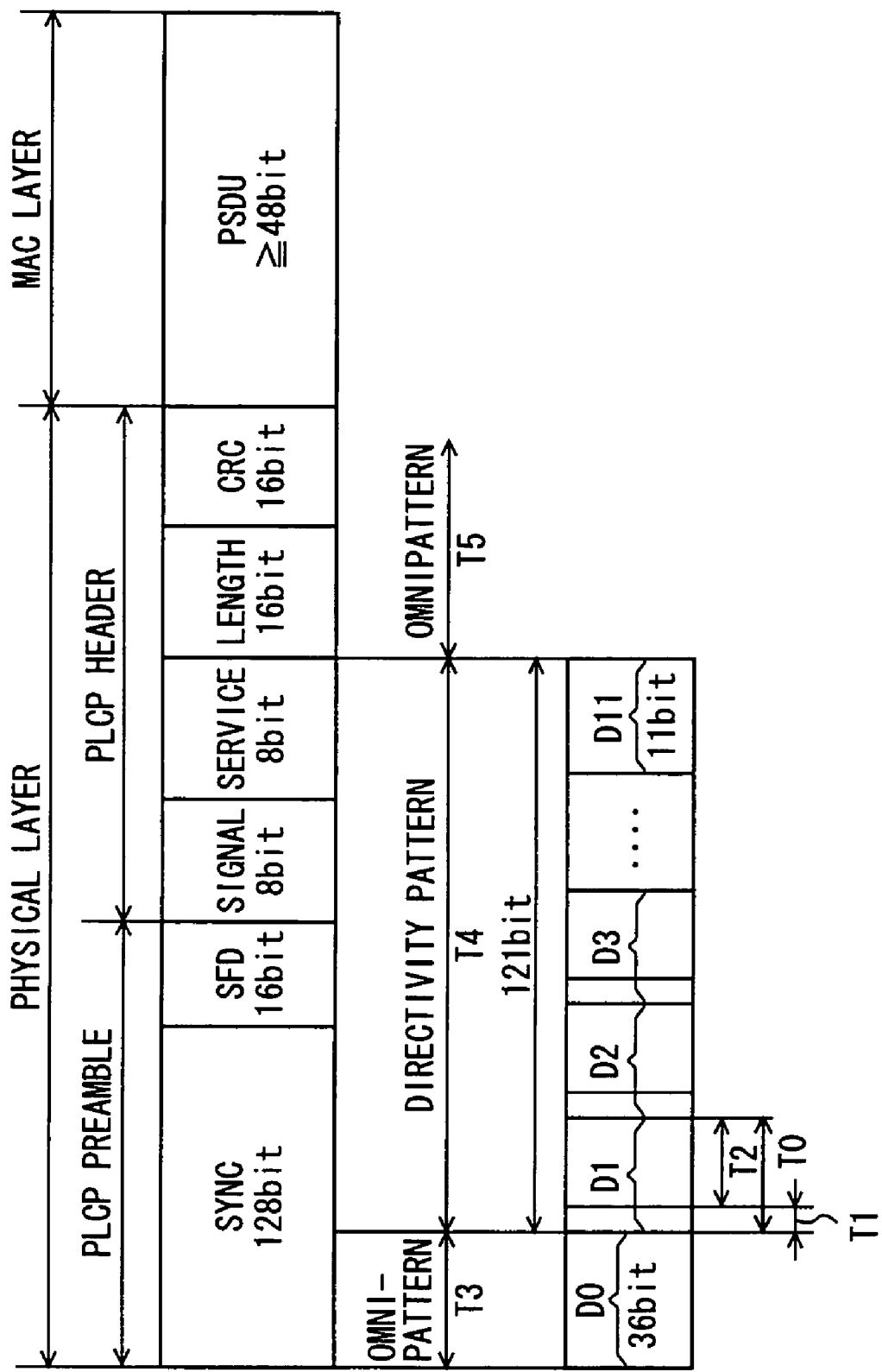
FIG. 13 shows a format of physical and MAC layers of a prescribed communications protocol IEEE 802.11b (or IEEE 802.11g).

FIG. 13 shows a format of physical and media access control (MAC) layers of the predetermined communications protocol IEEE802.11b (or IEEE802.11g). The physical layer is a hierarchical layer converting data to an electrical signal to in effect perform transmission. The physical layer is formed of a data format common to both IEEE802.11b and IEEE802.11g. The MAC layer is a hierarchical layer performing highly reliable data transmission between each radio device. The physical layer is formed of a physical layer convergence protocol (PLCP) preamble and a PLCP header.

The PLCP preamble is formed of a synchronization field (SYNC) signal and a start frame delimeter (SFD) signal. The PLCP header is formed of a signal or data rate (SIGNAL) signal, a SERVICE signal, a LENGTH signal, and a cyclic redundancy code (CRC) signal.

The SYNC signal has 128-bit data length and is used to establish synchronization. The SFD signal has a 16-bit data length and indicates the end of the PLCP preamble.

The SIGNAL signal has an 8-bit data length and indicates the MAC layer's data rate. The SERVICE signal has an 8-bit data length and is reserved for extending a function. The LENGTH signal has a 16-bit data length and indicates the MAC layer's data length. The CRC signal has a 16-bit data length and is used for error detection.

The MAC layer is formed of a PLCP service data unit (PSDU), which is data of the MAC layer having an at least 48-bit data length.

In the second embodiment in generating private keys Ks1, Ks2 radio devices 10A, 30A include given data in the physical layer and vary the directivity of array antenna 20 while perform transmission. More specifically, of the SYNC, SFD, SIGNAL, SERVICE, LENGTH and CRC signals, the SYNC, SFD, SIGNAL, and SERVICE signals are configured of a plurality of data D0-D11 obtained by dividing the given data.

Data D0 has a 36-bit data length. Furthermore, the plurality of data D1-D11 each have a 11-bit data length. If the 11-bit data length corresponds to a temporal length represented by a period T0, the plurality of data D1-D11 are each divided into a period D1 corresponding to a 3-bit data length and a period T2 corresponding to an 8-bit data length.

In generating private keys Ks1, Ks2, array antenna 20 is caused to function as the omnidirectional antenna for period T3 corresponding to the data length of data D0, as the directional antenna for a period T4 corresponding to the entire data length of data D1-D11, and as the omnidirectional antenna for a period T5 corresponding to the LENGTH and CRC signal's data length to transmit given data.

If in period T4 array antenna 20 is caused to function as the directional antenna array antenna 20 is switched in directivity sequentially. More specifically, in period T1 of each of the plurality of data D1-D11 the directivity of array antenna 20 is varied and in period T2 the varied directivity is applied to transmit data. As such, in the FIG. 13 example the array antenna 20 is varied in directivity 11 times and given data is thus transmitted.

The given data is received as when it is transmitted. In periods T3, T5 array antenna 20 is caused to function as the omnidirectional antenna and in period T4 array antenna 20 is caused to function as the directional antenna, and in receiving the given data the directivity of array antenna 20 is varied in period t1 of each of the plurality of data D1-D11 and strength of an radio wave received with the varied directivity is detected in period T2. As such, in the FIG. 13 example the given data is also received with array antenna 20 varied in directivity 11 times.

Note that in period T3 array antenna 20 is caused to function as the omnidirectional antenna because at an initial stage of communication it is necessary to cause auto gain control (AGC) to function to adjust a data reception level to have an optimal value. Furthermore in period T5 array antenna 20 is caused to function as an omni-direction antenna for the following reason: when an error is introduced in the physical and MAC layers' data reception, acknowledgement (an ACK signal) is not returned and a state of retransmission would continue. To prevent this, the LENGTH signal, associated with data of the MAC layer, and the CRC signal, determining whether the physical layer's data reception is successful or has failed, are transmitted and received via the omnidirectional antenna.

Figure 14:
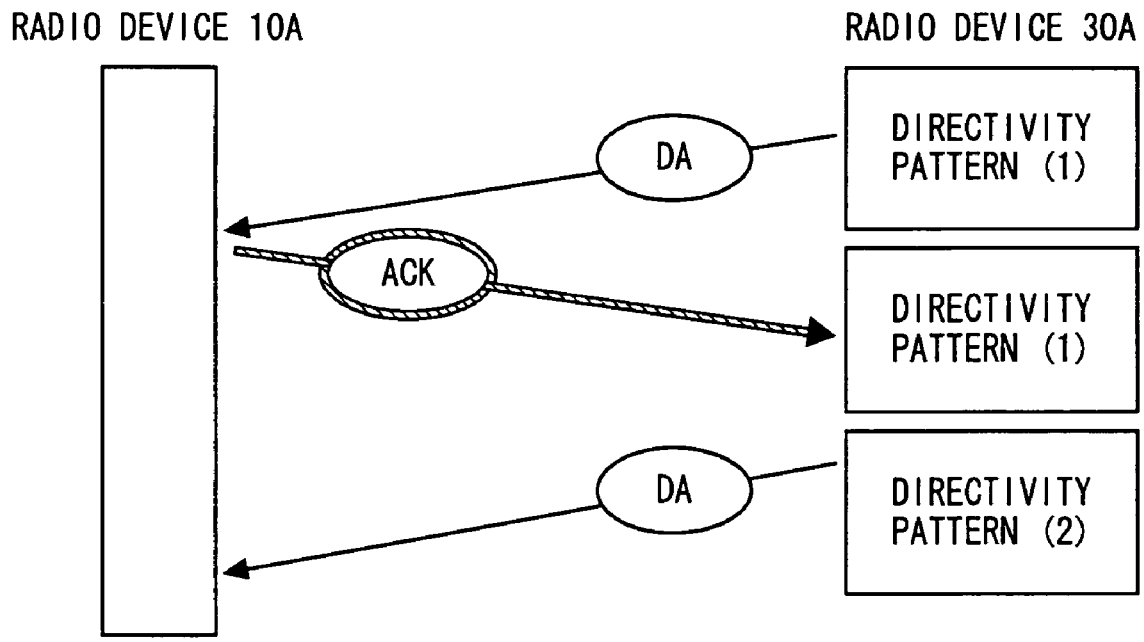
FIG. 14 shows a concept of a typical method of communicating data between two radio devices.
Figure 15:
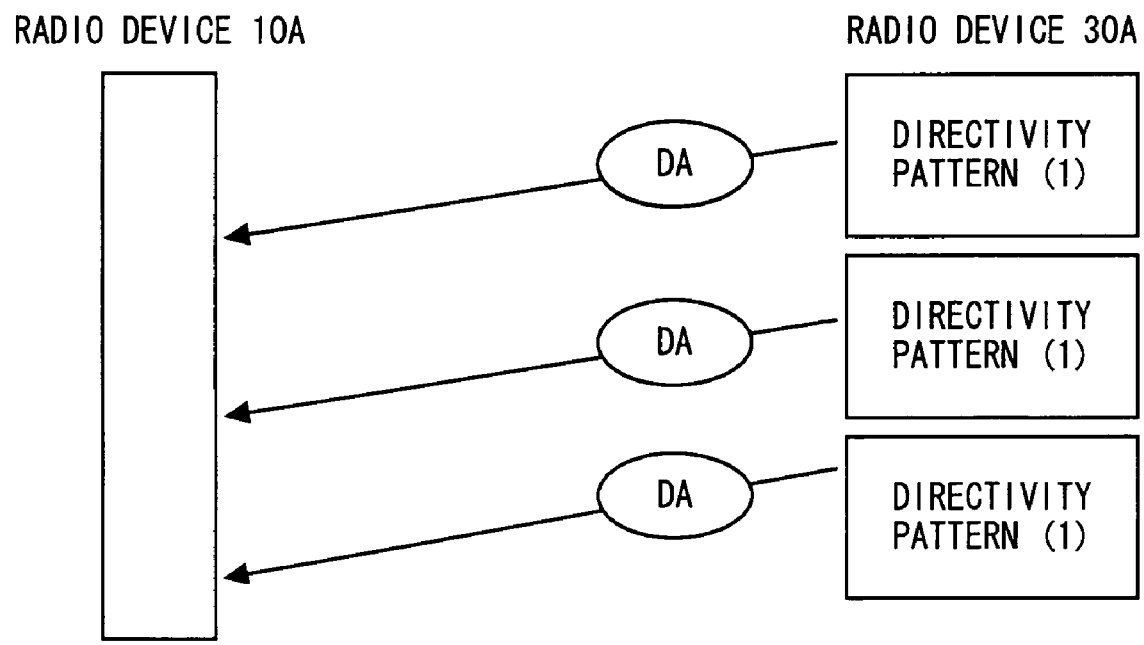
FIG. 15 conceptually shows retransmission of data between two radio devices.

FIG. 14 shows in concept a typical method employed to communicate data between the two radio devices 10A and 30A. FIG. 15 shows in concept retransmission of data between the two radio devices 10A and 30A. FIG. 16 shows in concept a method employed in the present embodiment to communicate data between the two radio devices 10A and 30A.

In the typical method, radio device 30A switches the directivity of array antenna 20 in accordance with a directivity pattern (1) sequentially to transmit given data DA to radio device 10A. Radio device 10A confirms that given data DA has been received, and in response transmits acknowledgement ACK to radio device 30A. Radio device 30A switches the directivity array antenna 20 in accordance with directivity pattern (1) sequentially to receive acknowledgement ACK. Subsequently, radio device 30A switches the directivity of array antenna 20 in accordance with a directivity pattern (2) sequentially to transmit given data DA to radio device 10A, and radio device 10A receives given data DA from radio device 30A (see FIG. 14).

In such a typical method as described above, however, if the directivity of array antenna 20 is varied and the data of the SYNC and subsequent signal shown in FIG. 13 are erroneously received, the physical layer's synchronization is established, however the MAC and higher layers' synchronization fail to be established. As a result, acknowledgement ACK is not returned and, as shown in FIG. 15, the directivity of array antenna 20 is switched in accordance with directivity pattern (1) sequentially and given data DA retransmitted continuously. As a result, radio devices 10A and 30A cannot perform bidirectional communication.

Accordingly in the present invention the method shown in FIG. 16 is employed to communicate given data DA. More specifically, radio device 30A sets an omnipattern for array antenna 20 to transmit given data DA to radio device 10A. More specifically, radio device 30A causes array antenna 20 to function as the omnidirectional antenna to transmit given data DA to radio device 10A.

Radio device 10A confirms that given data DA has been received from radio device 30A, and in response transmits acknowledgement ACK to radio device 30A. Radio device 30A switches the directivity of array antenna 20 in accordance with directivity pattern (1) sequentially to receive acknowledgement ACK. Subsequently, radio device 30A switches the directivity of array antenna 20 in accordance with directivity pattern (1) sequentially to transmit given data DA to radio device 10A, and radio device 10A receives given data DA from radio device 30A (see FIG. 16).

In the FIG. 16 method, radio device 30A in an initial transmission employs the omnipattern with which a communication has been established. This can ensure reception of acknowledgement ACK from radio device 10A and hence bidirectional communication between radio devices 10A and 30A.

Acknowledgement ACK is formed of the format of the physical layer shown in FIG. 13, and when radio device 30A switches the directivity of array antenna 20 in accordance with directivity pattern (1) sequentially to receive acknowledgement ACK, it can detect a plurality of radio waves' strength corresponding to the plurality of data D1-D11 included in acknowledgement ACK received. Furthermore, radio device 30A employs directivity pattern (1) applied in receiving acknowledgement ACK to switch the directivity of array antenna 20 sequentially to transmit given data DA to radio device 110A, and radio device 10A can detect the same plurality of radio waves' strength as those detected by radio device 30A.

If the FIG. 16 method is employed to communicate given data between radio devices 10A and 30A once, radio devices 10A and 30A detect strength profiles PI11 and PI12, respectively, formed of 11 radio waves' strength, and radio devices 10A, 30A transmit and receive given data m times repeatedly to detect m strength profiles PI1*l*-PI1*m* and PI2*l*~PI2*m*, respectively, wherein m is a natural number.

Strength profiles PI11-PI1*m* as a whole include radio waves' strength equal to n radio waves' strength WI1-Win shown in FIG. 7. As such, as radio devices 10A and 30A communicate given data once, of the n radio waves' strength WI1-Win 11 radio waves' strength WI(i)-WI(i+10) are detected, wherein i=1 to n−10.

More specifically in the present invention a prescribed communications protocol IEEE802.11b (or IEEE802.11g) has the physical layer with given data DA included therein and radio devices 10A and 30A thus perform communications m times repeatedly to detect n radio waves' strength WI1-Win and therefrom generate private keys Ks1, Ks2.

Figure 17:
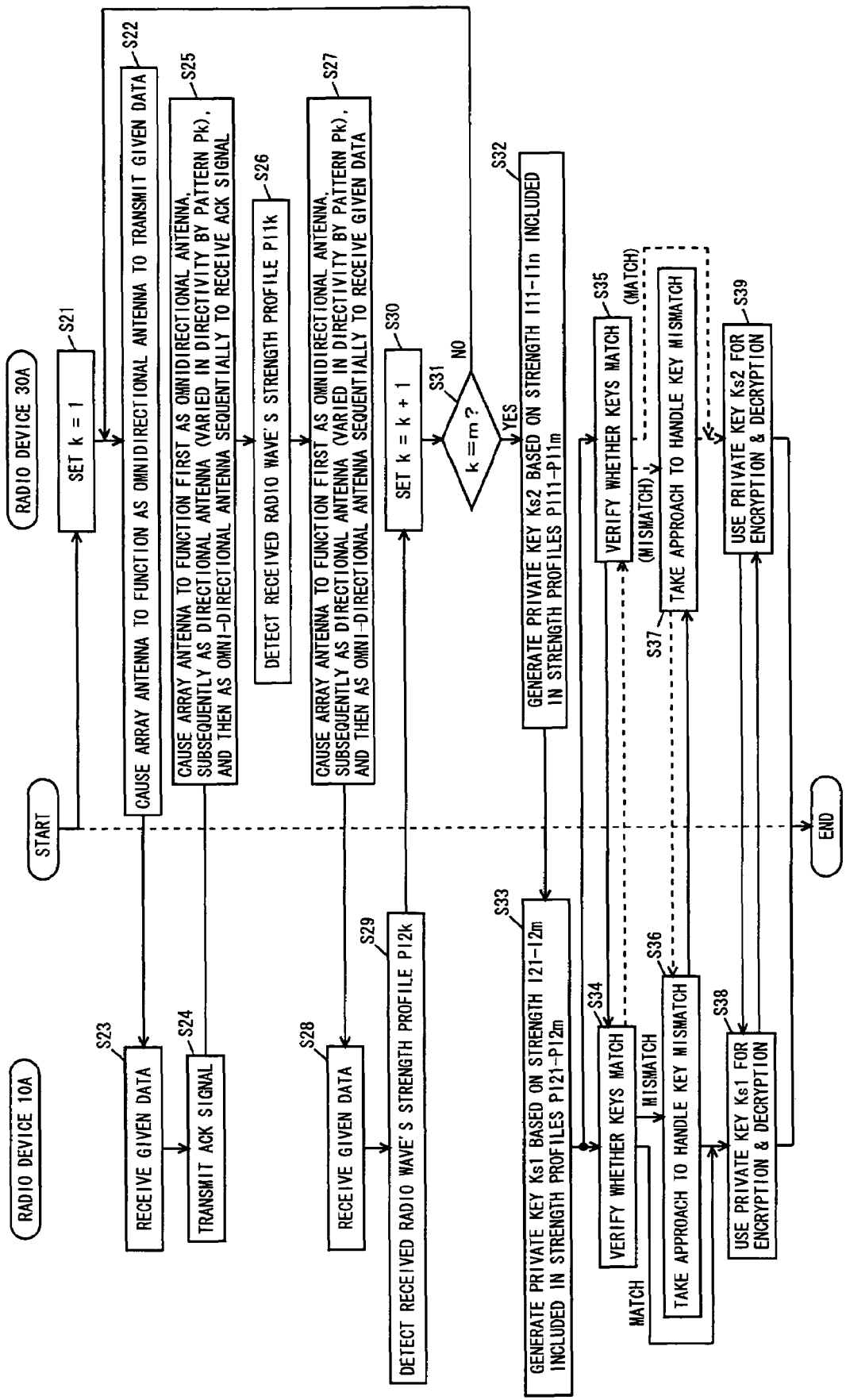
FIG. 17 is a flow chart for illustrating an operation performed to allow communication between two radio devices shown in FIG. 9.

FIG. 17 is a flow chart for illustrating an operation performing communication between the FIG. 9 to radio devices 10A and 30A. When a series of operations starts, in radio device 30A transmission processor 120 sets k=1 (step S21) and directivity setter 230A causes array antenna 20 to function as the omnidirectional antenna to transmit given data DA to radio device 10A (step S22).

Subsequently antenna unit 130 of radio device 10A receives given data DA (step S23) and outputs given data DA to reception processor 140. When reception processor 140 confirms the reception of given data DA, transmission processor 120 transmits acknowledgement (the ACK signal) via antenna unit 130 to radio device 30A (step S24).

In radio device 30A directivity setter 230A causes antenna unit 220 to function as the omnidirectional antenna, the directional antenna, and then the omnidirectional antenna sequentially to receive acknowledgement (the ACK signal) (step S25). More specifically, array antenna 20 receives the FIG. 13 data D0 while functioning as the omnidirectional antenna, data D1, D11 while varying its directivity by a pattern Pk to provide 11 directivities, and the LENGTH and CRC signals while functioning as the omnidirectional antenna.

Antenna unit 220 outputs to profile generator 150 a plurality of radio waves corresponding to the plurality of data D1-D11 received. Profile generator 150 detects strength profile PI1*k* of the plurality of radio waves received from antenna unit 220 (step S26).

Subsequently in radio device 30A signal generator 110A generates and outputs given data to transmission processor 120, and transmission processor 120 assigns the given data to the physical layer's data D1-D11 to transmit the given data to radio device 10A via antenna unit 220 caused to function as the omnidirectional antenna, the directional antenna and then the omnidirectional antenna sequentially (step S27). More specifically, antenna unit 220 transmits the FIG. 13 data D0 while functioning as the omnidirectional antenna, data D1, D11 while varying its directivity by pattern Pk to provide 11 directivities, and the LENGTH and CRC signals while functioning as the omnidirectional antenna.

In radio device 10A antenna unit 130 receives the given data from radio device 30A (step S28) and antenna unit 220 outputs to profile generator 150 a plurality of radio waves corresponding to the plurality of data D1-D11 received. Profile generator 150 detects strength profile PI2*k* of the plurality of radio waves received from antenna unit 130 (step S29).

Subsequently in radio device 30A transmission processor 120 sets k=k+1 (step S30) and determines whether k=m (step S31). If not, steps S22-S31 are repeated. More specifically, array antenna 20 has its directivity pattern varied by patterns P1-Pm to provide m directivity patterns and between antenna unit 130 of radio device 10A and antenna unit 220 of radio device 30A the radio wave configuring given data are thus communicated, and until strength profiles I1*l*-I1*m* and I2*l*-I2*m* are detected steps S2-S11 are repeated.

If at step S11 a decision is made that k=m, in radio device 30A profile generator 150 produces receive signal profile RSSI1 from strength I1*l*-I1*n* included in strength profiles I1*l*-I1*m* for output to key generator 160.

Key generator 160 detects a maximum strength WImax1 from receive signal profile RSSI1 and employs the detected maximum strength WImax1 to standardize receive signal profile RSSI1 to multivalue strength I1*l*-I1*n* and generate private key Ks2 with each multivalued value serving as a bit pattern (step S32).

Furthermore in radio device 10A profile generator 150 produces receive signal profile RSSI2 from strength I2*l*-I2*n* included in strength profiles I2*l*-I2*m* for output to key generator 160. Key generator 160 detects a maximum strength WImax2 from receive signal profile RSSI2 and employs the detected maximum strength WImax2 to standardize receive signal profile RSSI2 to multivalue strength I2*l*-I2*n* and generate private key Ks1 with each multivalued value serving as a bit pattern (step S33).

Steps S34-S39 are identical to steps S14-S19 in FIG. 8.

In steps S22-S24 array antenna 20 is caused to function as the omnidirectional antenna to establish communication between radio devices 10A and 30A. In steps S24-S26 the radio wave allowing radio device 30A to generate receive signal profile RSSI1 is transmitted from antenna 11 of radio device 10A to array antenna 20 of radio device 30A and radio device 30A also detects radio wave's strength profile PI1*k*. In steps S27-S29 the radio wave allowing radio device 10A to generate receive signal profile RSSI2 is transmitted from array antenna 20 of radio device 30A to antenna 11 of radio device 10A and radio device 10A also detects radio wave's strength profile PI2*k*. The radio wave configuring given data is transmitted from antenna 11 of radio device 10A to array antenna 20 of radio device 30A and vice versa alternately as the directivity of array antenna 20 is varied in accordance with pattern Pk. More specifically, the radio wave configuring the given data is communicated between antenna 11 of radio device 10A and array antenna 20 of radio device 30A by time division communication.

As such, the directivity of array antenna 20 can be varied in accordance with pattern Pk while from antenna 11 of radio device 10A to array antenna 20 of radio device 30A the radio wave configuring given data can be transmitted and radio device 30A can detect the radio wave's strength profile PI1*k*, and immediately thereafter the radio wave configuring the same given data can be transmitted from array antenna 20 of radio device 30A to antenna 11 of radio device 10A and radio device 10A can detect the radio wave's strength profile PI2*k*.

Consequently, between radio devices 10A and 30A the same transmission path characteristic can be ensured and the radio wave configuring given data can be communicated between radio devices 10A and 30A, and by radio wave's reversibility the radio wave's strength I1$l$-I1$n$ can be matched to the radio wave's strength I2$l$-I2$n$, respectively, and private key Ks1 generated in radio device 10A can be readily matched to private key Ks2 generated in radio device 30A.

Furthermore, as the radio wave configuring the prescribed signal is communicated between radio devices 10A and 30A by time division duplex, radio wave's interference can be reduced and the radio wave configuring the prescribed signal can be communicated between radio devices 10A and 30A via a single array antenna 20.

Furthermore, the given data can be included in the physical layer common to the prescribed communications protocol IEEE802.11b and IEEE802.11g and thus communicated between radio devices 10A and 30A. As such, if the communication protocol is changed from IEEE802.11b to IEEE802.11g, private keys Ks1, Ks2 can still be generated without changing the data format.

Furthermore when radio device 30A receives acknowledgement (the ACK signal) from radio device 10A and transmits given data to radio device 10A, radio device 30A employs the same pattern Pk to vary the directivity of array antenna 20 sequentially (see steps S25, S27). Using the same pattern Pk to vary the directivity of array antenna 20 sequentially to receive acknowledgement (the ACK signal) from radio device 10A (step S25) and transmitting the given data to radio device 10A (step S27) are repeated until k=m is achieved. As such, in steps S25 and S27, following pattern Pk to sequentially vary the directivity array antenna 20 corresponds to updating the directivity of array antenna 20 to receive acknowledgement (the ACK signal) from radio device 10A and maintaining the updated directivity and thus transmitting the given data to radio device 10A.

Thus the FIG. 16 method allows given data to be communicated between radio devices 10A and 30A to prevent the given data from repeated retransmission to ensure bidirectional communications between radio devices 10A and 30A. In other words, radio devices 10A and 30A can reliably generate the same private keys Ks1 and Ks2.

Furthermore, the directivity of array antenna 20 is varied in accordance with pattern Pk while radio devices 10A and 30A communicate the radio wave configuring given data to generate receive signal profiles RSSI1, RSSI2 employed to generate private keys Ks1, Ks2. As such, if eavesdropper 50 is arranged in the vicinity of radio device 30A having array antenna 20 attached thereto, as shown in FIG. 9, the eavesdropping of private keys Ks1, Ks2 by the eavesdropper can be reduced.

More specifically, eavesdropper 50 receives the radio wave from antenna 11 and array antenna 20 through antenna 51. However, array antenna 20 has a directivity varied in accordance with pattern Pk to transmit and receive the radio wave. As such, the radio wave transmitted and received between antenna 11 and array antenna 20 is different from that transmitted and received between antenna 11 or array antenna 20 and antenna 51. As such, eavesdropper 50 cannot transmit or receive the same radio wave as that transmitted from and received by radio device 30A nor obtain the same strength as radio wave's strength PI1$k$, and as a result cannot eavesdrop private keys Ks1, Ks2.

Thus the present invention is characterized in that array antenna 20 having a directivity electrically switchable is attached to radio device 30A arranged in the vicinity of eavesdropper 50.

Furthermore, key-verifying data DCFM1-DCFM4 are generated by subjecting private keys Ks1, Ks2 to irreversible arithmetic operation or monodirectional operation, and if key-verifying data DCFM1-DCFM4 are eavesdropped the possibility that private keys Ks1, Ks2 are decrypted by the unwanted party can be significantly limited.

Furthermore, syndromes s1, s2 are obtained by multiplying keys $x_1$, $x_2$ indicating the private keys Ks1, Ks2 bit pattern by the check matrix H transposition $H^T$. As such, if syndromes s1, s2 are eavesdropped, information's bit pattern is not immediately conjectured unless a particular coding is assumed. Thus eavesdropping can be reduced and private key can be matched.

Note that radio devices 10A and 30A communicate in an operation which is in effect performed by a central processing unit (CPU): radio device 10A has a CPU which reads from a read only memory (ROM) a program including the steps S23, S24, S28, S29, S33, S34, S36, and S38 in FIG. 17 and radio device 30A has a CPU which reads from ROM a program including the steps S21, S22, S25, S26, S27, S30, S31, S32, S35, S37, and S39 in FIG. 17, and the radio devices 10A and 30A respective CPUs execute the read programs and follow the FIG. 17 flow chart to communicate between radio devices 10A and 30A.

As such, the ROM corresponds to a computer (CPU) readable storage medium having a program recorded therein and executed to cause a computer (CPU) to perform an operation allowing communications between radio devices 10A and 30A.

The program including each step shown in FIG. 17 is furthermore a program causing the computer (CPU) to perform communications between radio devices 10A and 30A in accordance with a plurality of radio waves received while changing the directivity of array antenna 20 to form a plurality of directivities sequentially. The remainder is as has been described in the first embodiment.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applied to radio communications systems capable of reducing eavesdropping of a private key.

The invention claimed is:

1. A radio communications system comprising:
   a first antenna having a directivity electrically switchable;
   a second antenna; and
   first and second radio devices mutually transmitting and receiving a radio wave through a radio transmission path via only said first and second antennas, wherein:
   said first radio device receives a radio wave or waves from said second radio device while changing a directivity of said first antenna with prescribed patterns to form a plurality of directivities, generates a first receive signal profile indicative of a signal strength of a plurality of radio waves received with the respective ones of the directivities, and generates a first private key based on the generated first receive signal profile; and
   said second radio device receives a radio wave or waves from said first radio device while changing a directivity of said first antenna with prescribed patterns to form a plurality of directivities, generates a second receive signal profile indicative of a signal strength of a plurality of radio waves received with the respective ones of the directivities, and generates a second private key identical to said first private key based on the generated second receive signal profile.

2. The radio communications system of claim 1, wherein:
said first and second receive signal profiles are each formed of a plurality of signal strength of a plurality of radio waves corresponding to said plurality of directivities; and
said first and second radio devices quantize said plurality of strength to generate said first and second private keys, respectively.

3. The radio communications system of claim 1, wherein said first and second radio devices transmit and receive said plurality of radio waves in a time division duplex system.

4. The radio communications system of claim 1, wherein said first radio device verifies that said first private key generated matches said second private key.

5. A radio communications system comprising:
a first antenna having a directivity electrically switchable;
a second antenna; and
first and second radio devices mutually transmitting and receiving a radio wave through a radio transmission path via only said first and second antennas, wherein:
said first radio device receives a radio wave or waves corresponding to a plurality of data transmitted by said second radio device in accordance with a prescribed communications protocol while changing a directivity of said first antenna with prescribed patterns to form a plurality of directivities, generates a first receive signal profile indicative of a signal strength of a plurality of radio waves received with the respective ones of the directivities, and generates a first private key based on the generated first receive signal profile; and
said second radio device receives a radio wave or waves corresponding to a plurality of data transmitted by said first radio device in accordance with a prescribed communications protocol while changing a directivity of said first antenna with prescribed patterns to form a plurality of directivities, generates a second receive signal profile indicative of a signal strength of a plurality of radio waves received with the respective ones of the directivities, and generates a second private key identical to said first private key based on the generated second receive signal profile.

6. The radio communications system of claim 5, wherein when said first radio device has said first antenna controlled to be omnidirectional said first radio device establishes said radio transmission path between said first radio device and said second radio device and thereafter said first radio device has said first antenna changing the directivity to form said plurality of directivities, while said first radio device communicates said plurality of data with said second radio device.

7. The radio communications system of claim 6, wherein when said first radio device communicates each of said data with said second radio device, said first radio device updates a directivity of said first antenna (20) to receive said data from said second radio device and maintains said updated directivity of said first antenna to transmit said received data to said second radio device.

8. The radio communications system of claim 6, wherein:
said prescribed communications protocol is formed of a plurality of hierarchical layers;
said plurality of data are included in a data format in a hierarchical layer of said plurality of hierarchical layers converting said data to said electrical signal; and
said hierarchical layer converting said data to said electrical signal is common to a plurality of communications protocols.

9. The radio communications system of claim 5, wherein said plurality of data are each formed of a section detecting a strength of a radio wave received from said first and second radio devices and a section changing the directivity of said first antenna.

10. The radio communications system of any one of claims 1-3 or 5-9, wherein when said first private key generated does not match said second private key, said first radio device matches said first private key (Ks2) to said second private key.

11. The radio communications system of any one of claims 1-9, wherein said first antenna is provided for said first radio device arranged adjacent to a terminal of an eavesdropper.

12. The radio communications system of any one of claims 1-9, wherein said first and second radio devices employ said first and second private keys to encrypt and decrypt data, and communicate said data.

* * * * *